US010735477B2

(12) United States Patent
Hasegawa et al.

(10) Patent No.: US 10,735,477 B2
(45) Date of Patent: Aug. 4, 2020

(54) SYSTEM, APPARATUS AND ASSOCIATED METHODOLOGY FOR ESTABLISHING MULTIPLE DATA COMMUNICATIONS BETWEEN TERMINALS

(71) Applicants: Takashi Hasegawa, Kanagawa (JP); Takahiro Asai, Kanagawa (JP)

(72) Inventors: Takashi Hasegawa, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1078 days.

(21) Appl. No.: 14/874,828

(22) Filed: Oct. 5, 2015

(65) Prior Publication Data
US 2016/0112465 A1   Apr. 21, 2016

(30) Foreign Application Priority Data

Oct. 16, 2014   (JP) .................................. 2014-211516

(51) Int. Cl.
  *H04L 29/06*   (2006.01)
(52) U.S. Cl.
  CPC ...... *H04L 65/1069* (2013.01); *H04L 65/1073* (2013.01); *H04L 65/1086* (2013.01); *H04L 65/1089* (2013.01); *H04L 65/4015* (2013.01)
(58) Field of Classification Search
  CPC ......... H04L 29/06394; H04L 29/06401; H04L 29/06408; H04L 65/4007; H04L 65/4015;
(Continued)

(56) References Cited

U.S. PATENT DOCUMENTS

| 6,810,035 B1 * | 10/2004 | Knuutila | H04W 4/12 370/354 |
| 6,856,809 B2 * | 2/2005 | Fostick | H04L 51/38 379/202.01 |

(Continued)

FOREIGN PATENT DOCUMENTS

JP   2010-087704   4/2010

*Primary Examiner* — George C Neurauter, Jr.
(74) *Attorney, Agent, or Firm* — Oblon, McClelland, Maier & Neustadt, L.L.P.

(57) ABSTRACT

A transmission system having a first transmission terminal and a second transmission terminal includes a first communications connector to connect first data communications between the first transmission terminal specified by first identification information and the second transmission terminal specified by second identification information, an identification information creating part to create fourth identification information of the second transmission terminal when receiving a request for connecting second data communications between the first transmission terminal and the second transmission terminal, and a second communications connector to acquire third identification information in association with the first identification information by referring to registration information registering the third identification information in association with the first identification information of the first transmission terminal, and connect the second data communications between the first transmission terminal specified by the third identification information and the second transmission terminal specified by the fourth identification information.

23 Claims, 23 Drawing Sheets

(58) Field of Classification Search
CPC ............. H04L 65/4023; H04L 65/1083; H04L 65/1086; H04L 65/1089
See application file for complete search history.

(56) References Cited

U.S. PATENT DOCUMENTS

| | | | | |
|---|---|---|---|---|
| 6,975,622 B2* | 12/2005 | Korycki | ................ | H04L 12/66 370/260 |
| 7,706,817 B2* | 4/2010 | Bamrah | ................ | H04L 12/189 455/466 |
| 9,197,480 B2* | 11/2015 | Boucadair | ............... | H04L 29/06 |
| 9,240,970 B2* | 1/2016 | Holzman | ............... | H04L 51/066 |
| 9,681,095 B2* | 6/2017 | Krishnamoorthy | ......................... | H04L 65/1089 |
| 10,069,830 B2* | 9/2018 | Okuyama | ............... | H04L 63/10 |
| 10,079,795 B2* | 9/2018 | Chakravarthy | ......... | H04L 51/32 |
| 10,165,224 B2* | 12/2018 | Holzman | ............... | H04L 51/066 |
| 10,244,451 B2* | 3/2019 | Jain | ...................... | H04L 69/321 |
| 2004/0246991 A1* | 12/2004 | Tsuzuki | ............ | H04L 29/12358 370/466 |
| 2005/0210394 A1* | 9/2005 | Crandall | ............. | H04L 12/1831 715/752 |
| 2007/0136601 A1* | 6/2007 | Kwon | ..................... | H04L 63/08 713/182 |
| 2010/0034122 A1* | 2/2010 | Croy | ...................... | H04W 4/023 370/260 |
| 2010/0199320 A1* | 8/2010 | Ramanathan | .......... | H04N 7/147 725/109 |
| 2010/0296634 A1* | 11/2010 | Schulzrinne | ......... | H04M 3/5116 379/45 |
| 2011/0164107 A1* | 7/2011 | Tian | .................... | H04L 65/1083 348/14.08 |
| 2011/0249073 A1* | 10/2011 | Cranfill | ................... | G06F 9/451 348/14.02 |
| 2012/0005299 A1* | 1/2012 | Xu | .................... | H04L 29/12358 709/208 |
| 2012/0110084 A1* | 5/2012 | Baratz | ............... | H04L 29/12094 709/204 |
| 2013/0014033 A1* | 1/2013 | Hamick | ................ | G06Q 50/01 715/757 |
| 2013/0111365 A1* | 5/2013 | Chen | ................ | H04M 1/72555 715/756 |
| 2013/0293664 A1* | 11/2013 | Tsang | ................. | H04L 12/1827 348/14.03 |
| 2015/0049160 A1* | 2/2015 | Krishnamoorthy | ......................... | H04L 61/1594 348/14.03 |
| 2015/0049164 A1* | 2/2015 | Krishnamoorthy | .... | H04N 7/147 348/14.11 |
| 2016/0197875 A1* | 7/2016 | Yeskel | ................ | H04L 65/4076 709/206 |

* cited by examiner

FIG.7

| SESSION ID | RELAY APPARATUS ID | REQUEST SOURCE COMMUNICATIONS ID | DESTINATION COMMUNICATIONS ID |
|---|---|---|---|
| se1 | 111a | 02aa | 01ab |
| se2 | 111b | 01ba | 01ca |
| se3 | 111d | 01bb | 01da |
| ... | ... | ... | ... |

FIG.8A

| COMMUNICATIONS ID | DESTINATION LIST |
|---|---|
| 01aa | 01ab@TV CONFERENCE MANAGEMENT SYSTEM, ... |
| 01ab | 01aa@TV CONFERENCE MANAGEMENT SYSTEM, 02AA@TEXT CHAT MANAGEMENT SYSTEM, ... |
| ... | ... |
| 01ba | 01bb@TV CONFERENCE MANAGEMENT SYSTEM, 01ca@TV CONFERENCE MANAGEMENT SYSTEM, ... |
| 01bb | 01ba@TV CONFERENCE MANAGEMENT SYSTEM, 02BB@TEXT CHAT MANAGEMENT SYSTEM, ... |
| ... | ... |
| 02aa | 02ab@TV CONFERENCE MANAGEMENT SYSTEM |
| 02ab | 02aa@TV CONFERENCE MANAGEMENT SYSTEM |

FIG.8B

| USER ID | DESTINATION LIST |
|---|---|
| 02AA | 02AB@TEXT CHAT MANAGEMENT SYSTEM, 01ab@TV CONFERENCE MANAGEMENT SYSTEM, ... |
| 02AB | 02AA@TEXT CHAT MANAGEMENT SYSTEM, ... |
| ... | ... |
| 02BA | 02BB@TEXT CHAT MANAGEMENT SYSTEM, ... |
| 02BB | 02BA@TEXT CHAT MANAGEMENT SYSTEM, 01bb@TV CONFERENCE MANAGEMENT SYSTEM, ... |
| ... | ... |

FIG.9

| SERVICE NAME | MANAGEMENT SYSTEM NAME |
|---|---|
| TV CONFERENCE | TV CONFERENCE MANAGEMENT SYSTEM |
| TEXT CHAT | TEXT CHAT MANAGEMENT SYSTEM |
| ... | ... |

FIG.10B

| USER ID | PASSWORD | USER NAME |
|---|---|---|
| 01AA | AAAA | ⋮ |
| 01AB | ABAB | ⋮ |
| 01BA | BABA | ⋮ |
| ⋮ | ⋮ | ⋮ |
| 02AA | AABB | Mike |
| 02AB | BBAA | Ryu |
| ⋮ | ⋮ | ⋮ |

FIG.10A

| COMMUNICATIONS ID | PASSWORD | ID CREATION AUTHORIZATION |
|---|---|---|
| 01aa | aaaa | ⋮ |
| 01ab | abab | ⋮ |
| 01ba | baba | ⋮ |
| ⋮ | ⋮ | ⋮ |
| 02aa | aabb | ○ |
| 02ab | abab | ⋮ |
| ⋮ | ⋮ | ⋮ |

FIG.11

| TERMINAL TYPE NAME | SERVICE NAME |
|---|---|
| TV CONFERENCE-SPECIFIC | TV CONFERENCE |
| GENERAL-PURPOSE | TV CONFERENCE, TEXT CHAT |
| CHAT-SPECIFIC | TEXT CHAT |
| ... | ... |

FIG.12

| COMMUNICATIONS ID /USER ID | NAME | OPERATING STATUS | REPORTING DESTINATION | RECEIVED DATE AND TIME | IP ADDRESS |
|---|---|---|---|---|---|
| 01aa | AA CONFERENCE TERMINAL | ONLINE (COMMUNICATIVE) | — | 2013.11.10.13:40 | 1.2.1.3 |
| 01ab | AB CONFERENCE TERMINAL | OFFLINE | — | 2013.11.09.12:00 | 1.2.1.4 |
| ... | ... | ... | ... | ... | ... |
| 01ba | BA CONFERENCE TERMINAL | ONLINE (ENGAGED) | — | 2013.11.10.13:45 | 1.2.2.3 |
| 01bb | BB CONFERENCE TERMINAL | ONLINE | — | 2013.11.10.13:50 | 1.2.2.4 |
| ... | ... | ... | ... | ... | ... |
| 02AA | AA MOBILE TERMINAL | ONLINE (COMMUNICATIVE) | TV CONFERENCE MANAGEMENT SYSTEM | 2013.11.25.14:30 | 1.4.1.1 |
| 02AB | AB MOBILE TERMINAL | ONLINE (COMMUNICATIVE) | — | 2013.11.25.14:29 | 1.4.1.2 |
| ... | ... | ... | ... | ... | ... |
| 02BA | BA MOBILE TERMINAL | OFFLINE | — | 2013.11.24.13:30 | 1.5.1.1 |
| 02BB | BB MOBILE TERMINAL | ONLINE (COMMUNICATIVE) | TV CONFERENCE MANAGEMENT SYSTEM | 2013.11.15.14:25 | 1.5.1.2 |
| ... | ... | ... | ... | ... | ... |

FIG.13

| MANAGEMENT NUMBER | COMMUNICATIONS ID | USER ID |
|---|---|---|
| 1 | 01aa | 01AA |
| 2 | 01ab | 01AB |
| 3 | 01ba | 01BA |
| 4 | 01bb | 01BB |
| 5 | 02aa | 02AA |
| 6 | 02ab | 02AB |
| 7 | 02ba | 02BA |
| 8 | 02bb | 02BB |

FIG.20

| MANAGEMENT NUMBER | COMMUNICATIONS ID | USER ID |
|---|---|---|
| 1 | 01aa | 01AA |
| 2 | 01ab | 01AB |
| 3 | 01ba | 01BA |
| 4 | 01bb | 01BB |
| 5 | 02aa | 02AA |
| – | – | – |
| 6 | 02ba | 02BA |
| 7 | 02bb | 02BB |

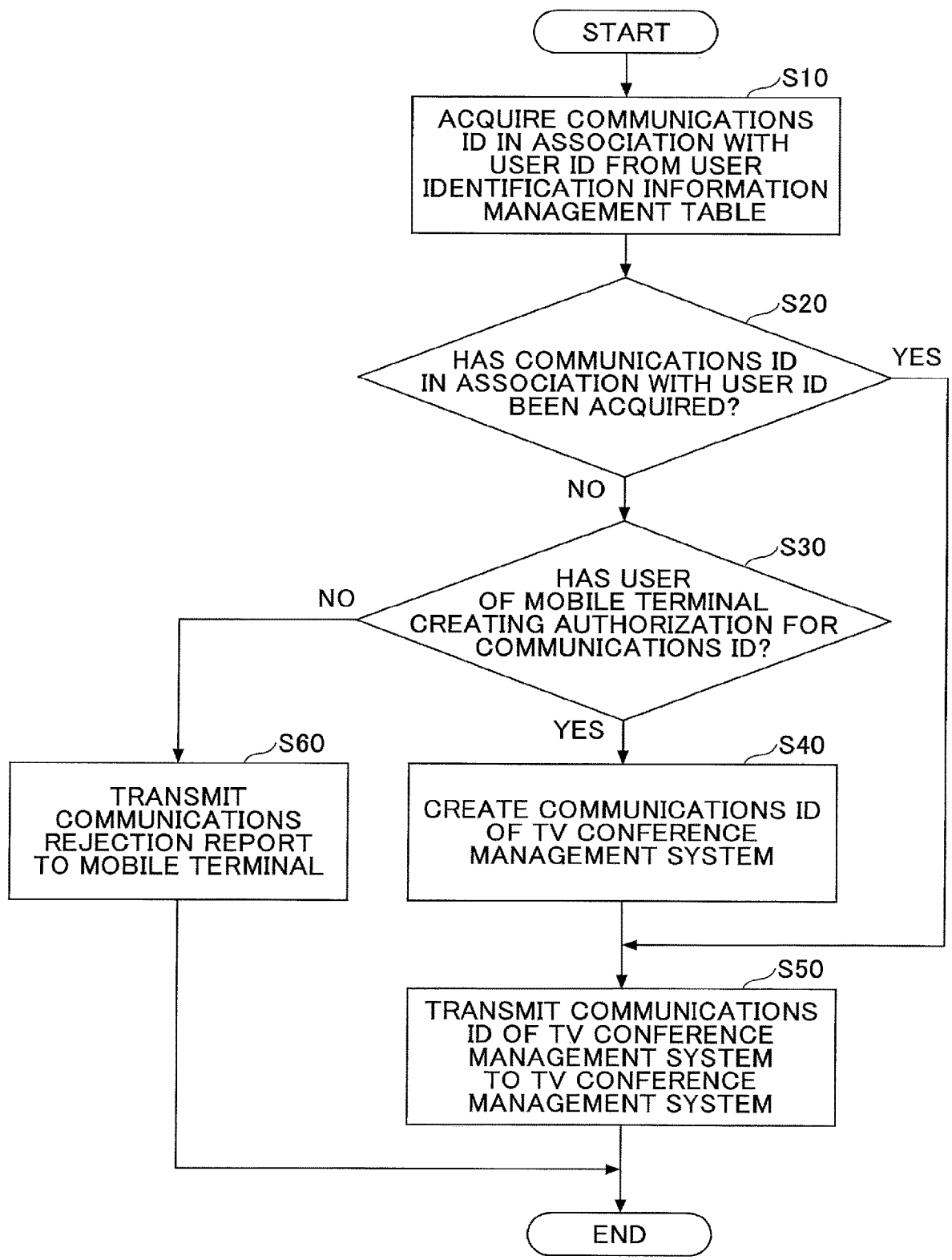

SYSTEM, APPARATUS AND ASSOCIATED METHODOLOGY FOR ESTABLISHING MULTIPLE DATA COMMUNICATIONS BETWEEN TERMINALS

BACKGROUND OF THE INVENTION

1. Field of the Invention

The disclosures discussed herein relate to a transmission system, a communications control apparatus, a communications control method, a communications method, and a recording medium.

2. Description of the Related Art

Transmission systems have been widely used for performing communications between multiple terminal apparatuses via a communications network such as the Internet. There are known in the art services employing transmission systems such as a text chat service or a TV conference service.

Some terminals are configured to use multiple services, and users of such terminals are capable of switching between desired services or use those services in parallel by operating their terminals.

In order for the user to use different services, the user generally needs to have an account for each of the services. The user needs to be authenticated with different accounts for the services to receive the services. Further, when the user desires to use the service via which the user performs communications with a communication partner, the user needs to specify an account (ID) of the communications partner.

Hence, when user desires to perform communications with the communication partner in a different service while performing communications with the same communication partner in a certain service, the user may fail to perform communications with the communication partner in the different services unless the user knows the communication partner's account for the different service. There is proposed an example of a technology of informing a user of a communication partner's account for a different service while performing communications with the communication partner in a certain service (e.g., Japanese Laid-open Patent Publication No. 2010-087704, hereinafter referred to as "Patent Document 1"). Patent Document 1 discloses a server configured to receive a communications request from a first communications terminal to a second communications terminal via a second communications unit, subsequently acquire connection information of the second communications terminal in the second communications unit, and then perform communications between the first communications terminal and the second communications terminal via the second communications unit.

In such a related art communications method, the communications partner who is currently communicating in one service with the user needs to have an account for a different service in order to perform communications with the user in the different service. That is, when the user desires to perform communications with the communications partner in a service B while performing communications with the same communications partner in a service A, the communications partner needs to have an account for the service B to perform communications with the user in the service B.

RELATED ART DOCUMENT

Patent Document

Patent Document 1: Japanese Laid-open Patent Publication No. 2010-087704

SUMMARY OF THE INVENTION

Accordingly, it is a general object in one embodiment of the present invention to provide a transmission technology capable of allowing a user to perform communications in a service with a communications partner who does not have account information of the service while engaging in communications in a different service that substantially obviates one or more problems caused by the limitations and disadvantages of the related art.

According to an aspect of embodiments, there is provided a transmission system including a first transmission terminal and a second transmission terminal, the first transmission terminal transmitting data to the second transmission terminal. The transmission system includes a first communications connector configured to connect first data communications between the first transmission terminal specified by first identification information and the second transmission terminal specified by second identification information; an identification information creating part configured to create fourth identification information of the second transmission terminal when receiving a request for connecting second data communications between the first transmission terminal and the second transmission terminal; and a second communications connector configured to acquire third identification information in association with the first identification information by referring to registration information registering the third identification information in association with the first identification information of the first transmission terminal, and connect the second data communications between the first transmission terminal specified by the third identification information and the second transmission terminal specified by the fourth identification information.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an example of a session management table;

FIGS. 8A and 8B are diagrams illustrating examples of destination list management tables of the TV conference management system and the text chat management system;

FIG. 9 is a diagram illustrating an example of a service management table;

FIGS. 10A and 10B are diagrams illustrating examples of authentication management tables;

FIG. 11 is a diagram illustrating an example of a terminal type table;

FIG. 12 is a diagram illustrating an example of an ID management table;

FIG. 13 is a diagram illustrating an example of a user identification information management table;

FIG. 20 is a diagram illustrating an example of a user identification information management table (second embodiment);

FIG. 23 is a flowchart illustrating a process of steps S2.1 to S5 performed by the service management server illustrated in FIGS. 21 and 22.

DETAILED DESCRIPTION OF THE PREFERRED EMBODIMENTS

In the following, a description is given of embodiments with reference to the accompanying drawings.

Outline of Communications Method in Embodiment

Figure 1:
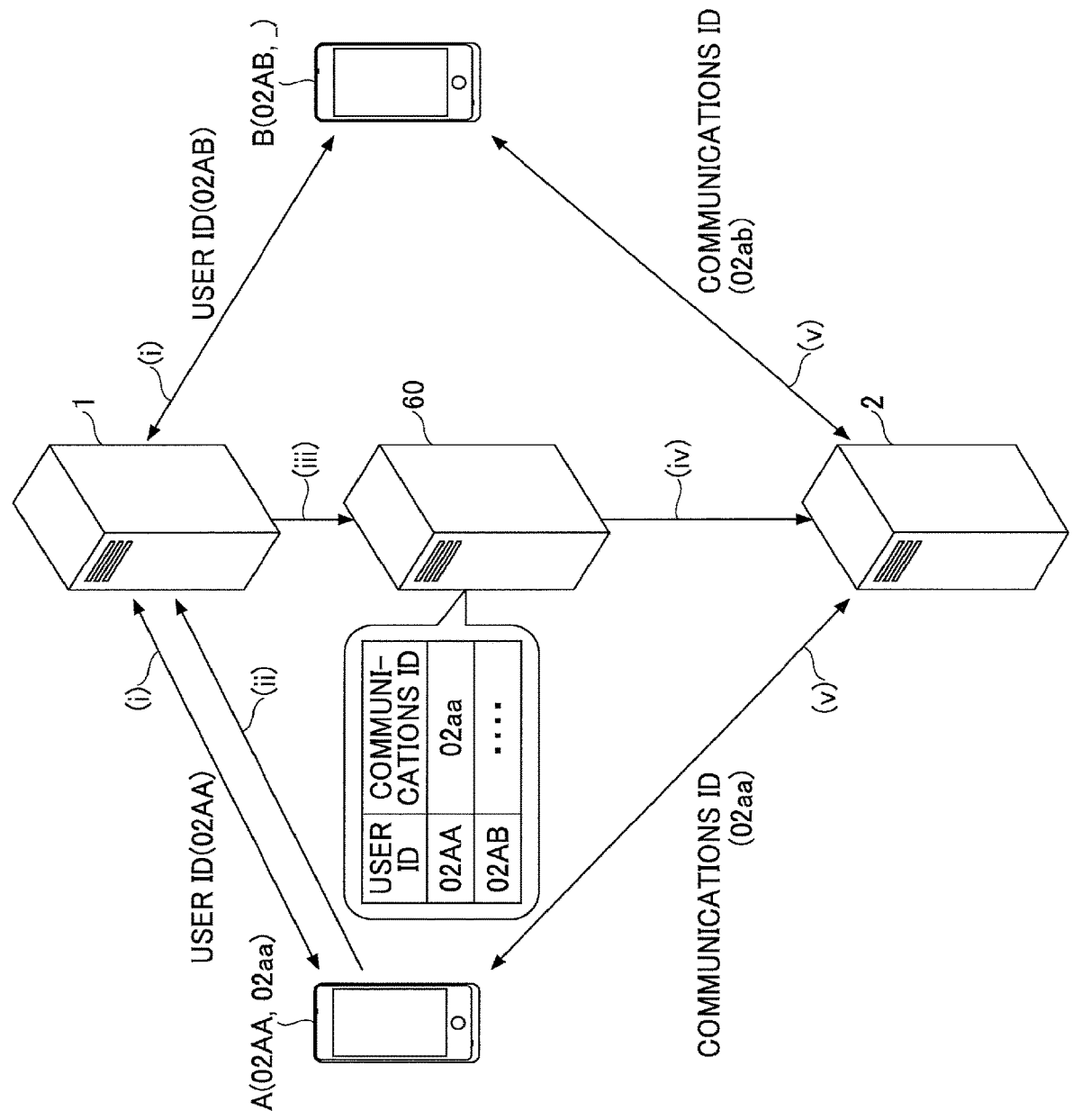
FIG. 1 is a diagram illustrating an example of a process of creating IDs when a user uses two transmission systems.

First, an illustration is given of a process in which a user performs communications with a communications partner using a service for which the communications partner does not have an account (ID). FIG. 1 is a diagram illustrating an example of a process of creating IDs when a user uses two transmission systems. In FIG. 1, a transmission terminal A has respective accounts for transmission management systems 1 and 2, whereas a transmission terminal B has an account for the transmission management system 1 but does not have an account for the transmission management system 2. The accounts for the transmission management systems 1 and 2 are managed in association with one another in a service management server 60.

(i) The transmission terminal A and the transmission terminal B perform communications by using a service provided by the transmission management system 1 with user IDs as IDs in the service. In this example, it is assumed that the user ID of the transmission terminal A is "02AA", and the user ID of the transmission terminal B is "02AB".

(ii) The user operates the transmission terminal A to transmits a request for communications with the transmission management system 2 to the transmission management system 1.

(iii) The transmission management system 1 transmits to the service management server 60 an inquiry about whether the communications ID is associated with the user ID.

(iV) The user ID of the user of the transmission terminal B is not associated with the communications ID. Hence, the service management server 60 transmits a request for creating the communications ID of the user of the transmission terminal B to the transmission management system 2.

(v) The transmission management system 2 creates the communications ID of the user of the transmission terminal B, and performs communications with the transmission terminal B. According to the above-described process, the transmission terminal A and the transmission terminal B use the respective communications IDs as identification information to use the service provided by the transmission management system 2 to perform communications with each other.

According to this embodiment, when the transmission terminal B while performing communications in the transmission management system 1 does not have the communications ID for the transmission management system 2, the service management server 60 requests for creating the communications ID. Hence, the transmission terminal A and the transmission terminal B may be able to use the service of the transmission management system 2 to perform communications with each other.

Terminology for Use in Embodiments

Transmission management system 1: In this embodiment, a later-described text chat management system is used as an example of the transmission management system 1.

Transmission management system 2: In this embodiment, a later-described TV conference management system is used as an example of the transmission management system 2.

ID of the TV conference management system: A communications ID. The communications ID is used for authentication when a user logs into the TV conference management system. Further, transmission terminals are identified with the communications IDs to transmit or receive image data and sound data between the transmission terminals. The communications ID is an example of third identification information or fourth identification information.

ID of the text chat management system: A user ID. The communications ID is used for authentication when a user logs into the text chat management system. Further, transmission terminals are identified with the user IDs to transmit or receive text messages between the transmission terminals. The user ID is an example of first identification information or second identification information.

The communications ID and the user ID of the embodiment indicate identification information such as a language, characters, symbols, or various types of marks used for uniquely identifying a transmission terminal or a user of the transmission terminal. Further, the communications ID may be identification information composed of a combination of at least two of the above language, characters, symbols, and marks.

Overall Configuration

Figure 2:
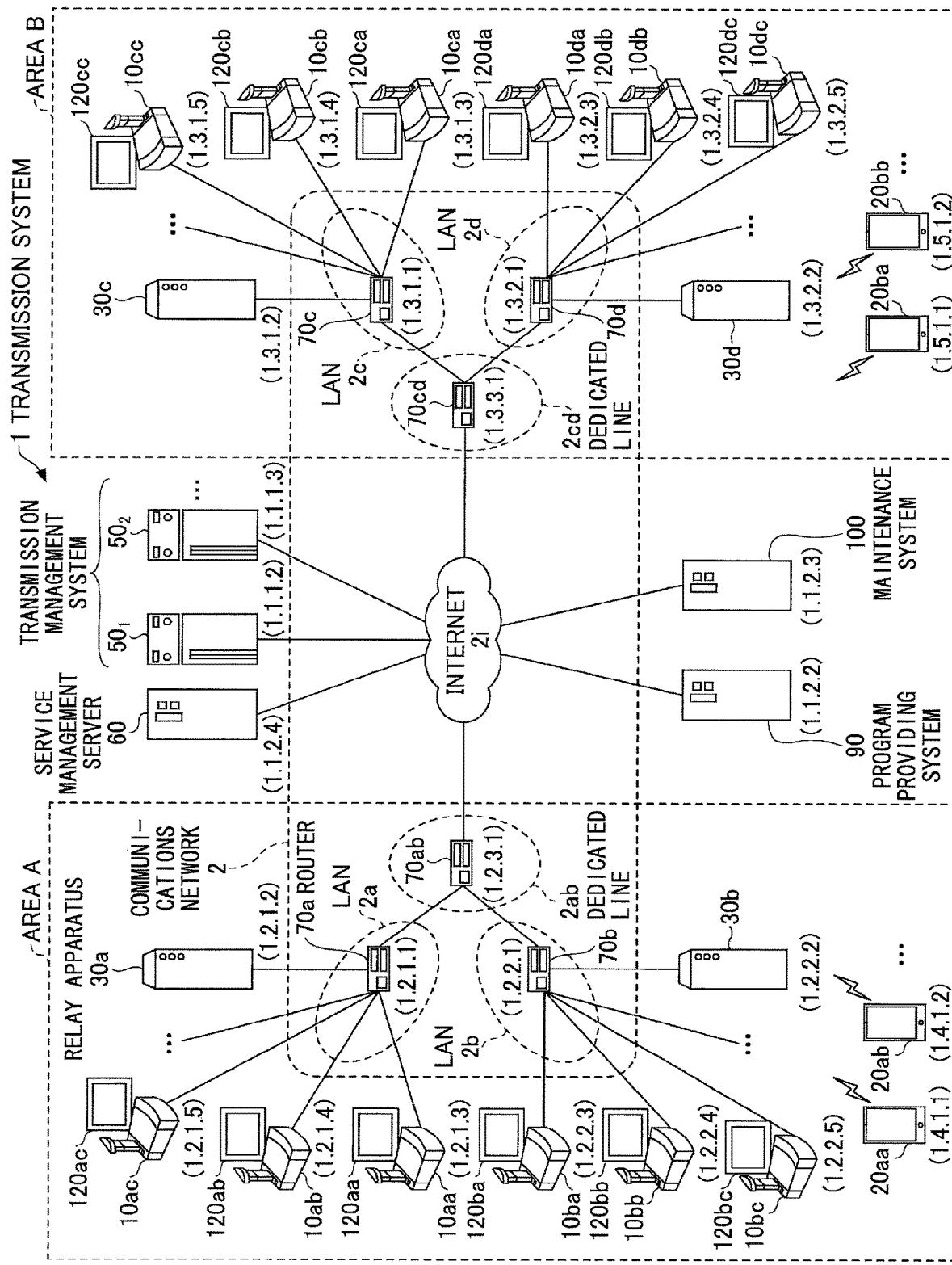
FIG. 2 is a schematic diagram illustrating an example of a transmission system according to an embodiment.

FIG. 2 is a schematic diagram illustrating an example of a transmission system according to an embodiment. Examples of the transmission system include a data providing system configured to transmit content data in one direction from one transmission terminal to another transmission terminal via a transmission management system, or a communications system configured to communicate information, emotions, and the like between two or more transmission terminals via a transmission management system. The communications system is configured to mutually communicate information, emotions, and the like between two or more communication terminals (corresponding to the "transmission terminals") via a communication management system (corresponding to the "transmission management system"). Examples of such a communications system include a TV conference system, a video telephony system, and an audio teleconference system, a voice telephony system, a PC (personal computer) screen sharing system, a text chat system, and the like.

In the present embodiment, the transmission system is described as an example of a communications system based on the assumption of a system conducting a TV conference or text chat. That is, the communications system of the embodiment indicates a transmission system capable of providing a TV conference service and a text chat service. Further, in this embodiment, a transmission management system is described based on the assumption of the TV conference management system $50_1$ and the text chat management system $50_2$ as an example of the communication management system. Similarly, a transmission terminal is described based on the assumption of a terminal serving as an example of a communication terminal capable of performing one or both of the TV conference and the text chat.

That is, the transmission terminal or the transmission management system of the embodiment is not only applied to the above-described transmission system but is also applied to another communications system, a data providing system, and the like. The transmission management system 50 is an example of a communications control apparatus or an information processing apparatus.

The transmission system 1 illustrated in FIG. 2 includes multiple transmission terminals (10aa, 10ab, . . . , 20aa, 20ab, . . . ), respective displays (120aa, 120ab, . . . ) for the transmission terminals (10aa, 10ab, . . . ), multiple relay apparatuses (30a, 30b, . . . ), multiple transmission management systems ($50_1$, $50_2$, . . . ), a service management server 60, a program providing system 90, and a maintenance system 100.

The transmission terminals 10 are configured to transmit or receive image data and sound data as an example of content data. That is, the transmission terminals 10 are TV conference terminals capable of utilizing the TV conference service. In this embodiment, the transmission terminals 10 may be TV conference service-specific terminals (TV conference-specific terminals). Hereinafter, the transmission terminals 10 may represent the TV conference-specific terminals 10. The TV conference-specific terminals 10 may be managed by the transmission management system $50_1$ configured to manage calling control of the TV conference service. Note that the TV conference-specific terminal 10 is not necessarily limited to a terminal having hardware itself being specifically configured for the TV conference service but includes a terminal having general-purpose hardware capable of utilizing applications specifically configured for the TV conference service.

Further, when the communication management system serves as the audio teleconference system, or the voice telephony system, sound data may be used as an example of content data to be transmitted and received for utilizing the voice telephony service.

On the other hand, the transmission terminals 20 are configured to transmit or receive image data and sound data, or text data as an example of content data. That is, the transmission terminals 20 are terminals capable of utilizing the TV conference or the text chat. In this embodiment, the transmission terminal 20 may be a general-purpose mobile terminal such as a tablet terminal, a mobile phone, and a smartphone capable of utilizing both the TV conference service and the chat service unless otherwise specified. The transmission terminal 20 may be configured to at least utilize the text chat service and is not necessarily configured to utilize the TV conference service. Note that the transmission terminals 20 may, for example, be wirelessly connected to a communications network 2 via a mobile phone communications network or WiFi (wireless fidelity). Hereinafter, the transmission terminals 20 may be represented as the mobile terminals 20. The mobile terminals 20 may be managed by the transmission management system $50_2$ configured to manage calling control of the text chat service.

Note that the above-described TV conference specific terminals 10 and the mobile terminals 20 are examples of the communication terminals. Examples of the communication terminals include various types of electronic apparatuses such as gaming apparatuses, general-purpose PC terminals, car navigation terminals installed on vehicles, projection apparatuses such as projectors, electronic whiteboards, wearable terminals in addition to conference-specific terminals, tablet terminals, mobile phones, and smartphones.

Note that any one of the TV conference-specific terminals (10aa, 10ab, . . . ) may be represented by a "TV conference-specific terminal 10", and any one of the mobile terminals (20aa, 20ab, . . . ) may be represented by a "mobile terminal 20".

Further, any one of the displays (120aa, 120ab, . . . ) may be represented by a "display 120", and any one of the relay apparatuses (30a, 30b, . . . ) may be represented by a "relay apparatus 30". Moreover, any one of the transmission management systems ($50_1$, $50_2$, . . . ) may be represented by a "transmission management system 50". Further, one of the TV conference-specific terminal 10 and the mobile terminal 20 serving as a terminal that requests the other one of the TV conference-specific terminal 10 and the mobile terminal 20 to start a TV conference or the text chat may be represented by a "request source terminal", and a terminal serving as a request destination may be represented by a "destination terminal".

In addition, in the transmission system 1, a management information session is established between the request source terminal and the destination terminal for transmitting and receiving various types of management information via the transmission management system 50. Further, a session for transmitting and receiving content data via the relay apparatus 30 is established between the request source terminal and the destination terminal. Note that when the content data transmitted and received between the request source terminal and the destination terminal are text data alone, a session is established via the transmission management system 50 between the request source terminal and the destination terminal, or a session may directly be established between the request source terminal and the destination terminal.

Note that in this embodiment, when the TV conference-specific terminal 10 serves as the request source terminal, a session is established via the transmission management system $50_1$. On the other hand, when the mobile terminal 20 serves as the request source terminal, a session is established via the transmission management system $50_2$. Specifically, calling control of the TV conference-specific terminal 10 utilizing the TV conference service alone is managed by the transmission management system $50_1$ whereas calling control of the mobile terminal 20 utilizing the text chat service is managed by the transmission management system $50_2$. In this embodiment, calling control for different services may be managed by different transmission management systems 50. Hence, calling control for any one of the services may be managed by a corresponding one of the transmission management systems 50. In the following, the management system $50_1$ is represented by a "TV conference management system $50_1$", and the management system $50_2$ is represented by a "text chat management system $50_2$".

The relay apparatuses 30 illustrated in FIG. 2 are configured to relay content data between the TV conference-specific terminals 10 and the mobile terminals 20.

The transmission management systems 50 are configured to perform login authentication, calling status management and destination list management of the transmission terminals, and calling status management of the relay apparatuses 30. Further, the above-described management is performed by each of the transmission management systems 50 configured to manage calling control of respective services. Specifically, the login authentication, the calling status management and the destination list management of the TV conference-specific terminals 10, the calling statuses of the relay apparatuses 30, and the like are managed by the TV conference management system $50_1$. On the other hand, the login authentication, the calling status management and the destination list management of the mobile terminals 20, the calling statuses of the relay apparatuses 30, and the like are managed by the text chat management system $50_2$. Note that as described later, status information of the transmission terminals such as calling status management is mutually reported to one another and between the associated transmission management systems 50.

The service management server 60 includes a DB (database) server or the like configured to manage information common between the transmission management systems 50. The service management server 60 may be a storage device such as a network storage configured to store information common between the transmission management systems 50. Note that in this embodiment, the service management server 60 is provided separately from the transmission management systems 50. However, the service management server 60 may be provided in each of the transmission management systems 50.

Routers (70a, 70b, 70c, 70d, 70ab, and 70cd) are configured to select an optimal one of routes for the content data. Note that in the following, any one of the routers (70a, 70b, 70c, 70d, 70ab, and 70cd) is represented by a "router 70".

The program providing system 90 includes a later-described HD (hard disk) 204, and is configured to store terminal-specific programs for causing the TV conference-specific terminals 10 or the mobile terminals 20 to implement various types of functional components or causing the TV conference-specific terminals 10 or the mobile terminals 20 to function as various types of components, and to transmit the terminal-specific programs to the TV conference-specific terminals 10 or the mobile terminals 20. Note that the TV conference-specific terminals 10 and the mobile terminals 20 are configured to transmit different terminal programs, respectively. Specifically, the program providing system 90 is configured to transmit terminal-specific programs for utilizing the TV conference service to the TV conference-specific terminals 10, and to transmit terminal-specific programs for utilizing the TV conference service and the text chat service to the mobile terminals 20. Note that the program providing system 90 may alternatively be configured to transmit the terminal-specific programs for utilizing the text chat service alone to the mobile terminals 20.

The HD 204 of the program providing system 90 is configured to further store relay apparatus-specific programs for causing the relay apparatuses 30 to implement various types of functional components or causing the relay apparatuses 30 to function as various types of components, and to transmit the relay apparatus-specific programs to the relay apparatuses 30. Further, the HD 204 of the program providing system 90 is configured to further store transmission management programs for causing the transmission management systems 50 to implement various types of functional components or causing the transmission management systems 50 to function as various types of components, and to transmit the transmission management programs to the transmission management systems 50. The HD 204 of the program providing system 90 is configured to further store information management programs for causing the service management server 60 to implement various types of functional components or causing the service management server 60 to function as various types of components, and to transmit the information management programs to the service management server 60.

The maintenance system 100 is a computer configured to perform maintenance, management, or support on at least one of the TV conference-specific terminals 10, the mobile terminals 20, the relay apparatuses 30, the transmission management systems 50, the service management server 60, and the program providing system 90. For example, when the maintenance system 100 is located domestically, and the TV conference-specific terminals 10, the mobile terminals 20, the relay apparatuses 30, the transmission management systems 50, the service management server 60, and the program providing system 90 are located abroad, the maintenance system 100 remotely performs maintenance, management, support, and the like on one or more of the TV conference-specific terminals 10, the mobile terminals 20, the relay apparatuses 30, the transmission management systems 50, the service management server 60, and the program providing system 90 via the communications network 2. Further, the maintenance system 100 may perform maintenance such as the management of model numbers, manufacturer's serial numbers, customers, maintenance and inspection, the malfunction history, and the like on one or more of the TV conference-specific terminals 10, the mobile terminals 20, the relay apparatuses 30, the transmission management systems 50, the service management server 60, and the program providing system 90 without being intervened by the communication network 2.

The TV conference-specific terminals (10aa, 10ab, 10ac, . . . ), the relay apparatus 30a, and the router 70a are connected to one another via a LAN 2a such that the TV conference-specific terminals (10aa, 10ab, 10ac, . . . ), the relay apparatus 30a, and the router 70a may be in communications with one another. The TV conference-specific terminals (10ba, 10bb, 10bc, ... ), the relay apparatus 30b, and the router 70b are connected to one another via a LAN 2b such that the TV conference-specific terminals (10ba, 10bb, 10bc, ... ), the relay apparatus 30b, and the router 70b may be in communications with one another. Moreover, the LAN 2a and the LAN 2b are connected via a dedicated line tab including a router 70ab such that the LAN 2a and the LAN 2b may be in communications with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office. Further, the mobile terminals (20aa, 20ab, ... ) are utilized in the area A.

Meanwhile, the TV conference-specific terminals (10ca, 10cb, 10cc, ... ), the relay apparatus 30c, and the router 70c are connected to one another via a LAN 2c such that the TV conference-specific terminals (10ca, 10cb, 10cc, ... ), the relay apparatus 30c, and the router 70c may be in communications with one another. The TV conference-specific terminals (10da, 10dd, 10dc, ... ), the relay apparatus 30d, and the router 70d are connected to one another via a LAN 2d such that the TV conference-specific terminals (10da, 10dd, 10dc, ... ), the relay apparatus 30d, and the router 70d may be in communications with one another. Moreover, the LAN 2c and the LAN 2d are connected via a dedicated line 2cd including a router 70cd such that the LAN 2c and the LAN 2d may be in communications with each other. The LAN 2c and the LAN 2d are constructed within a predetermined area B. For example, the predetermined area B may be the United States of America, the LAN 2c may be constructed within a NY Office, and the LAN 2d may be constructed within a Washington, D.C. Office. Further, the mobile terminals (20ba, 20bb, ... ) are utilized in the area B.

The area A and the area B are connected via the Internet 2i from the routers 70ab and 70cd, respectively, such that the area A and the area B may be in communications with each other.

Note that the TV conference-specific terminals 10 are not necessarily connected by a dedicated line, and may directly connected to the Internet 2i.

In addition, the transmission management systems 50, the program providing system 90, and the maintenance system 100 are connected via the Internet 2i to the TV conference-specific terminals 10, the mobile terminals 20, the relay apparatuses 30, and the service management server 60 such that the transmission management systems 50, the program providing system 90, and the maintenance system 100 may be in communications with the TV conference-specific terminals 10, the mobile terminals 20, the relay apparatuses 30, and the service management server 60. The transmission management systems 50, the service management server 60, and the program providing system 90 may be installed within the area A or the area B, or may be installed within an area other than these areas A and B.

Note that the LAN 2a, the LAN 2b, the dedicated line 2ab, the Internet 2i, the dedicated line 2cd, the LAN 2c, and the LAN 2d form the communications network 2 in this embodiment. The communications network 2 not only includes wired communications but partially includes wireless communications such as WiFi (Wireless Fidelity) or Bluetooth (registered trademark).

In FIG. 2, a combination of four numbers provided beneath each of the TV conference-specific terminals 10, the mobile terminals 20, the relay apparatuses 30, the transmission management systems 50, the service management server 60, the routers 70, the program providing system 90, and the maintenance system 100 simply represents an IP address using IPv4. For example, the IP address of the TV conference-specific terminal 10aa is "1.2.1.3". Further, the IP address may be IPv6 instead of IPv4; however, the IPv4 is employed for simplifying the illustration.

Note that each of the TV conference-specific terminals 10 and the mobile terminals 20 may be used for communications between two or more offices, and communications between different rooms within the same office, in addition to communications within the same room, communications between indoor and outdoor, and communications between outdoor and outdoor. When the TV conference-specific terminals 10 and the mobile terminals 20 used outdoor may perform communications via wireless communications such as a mobile communications network.

TV Conference-Specific Terminal

Figure 3:
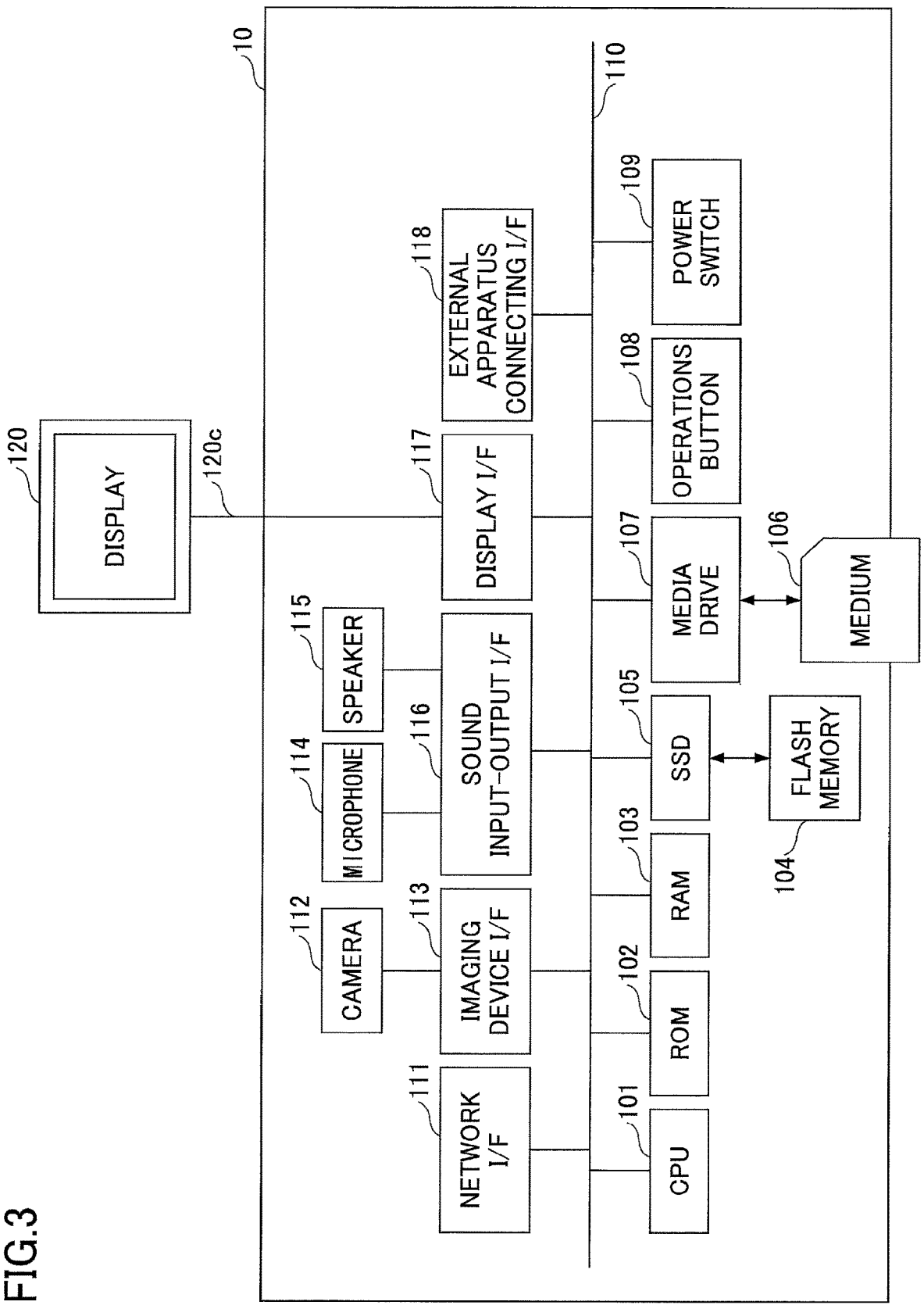
FIG. 3 is a hardware configuration diagram illustrating an example of a TV conference-specific terminal according to an embodiment.

Next, a description is given of a hardware configuration of the TV conference-specific terminal 10. FIG. 3 is a hardware configuration diagram illustrating a TV conference-specific terminal according to an embodiment. As illustrated in FIG. 3, the TV conference-specific terminal 10 includes a CPU (central processing unit) 101 configured to control operations of the entire TV conference-specific terminal 10, a ROM (read only memory) 102 storing programs for driving the CPU 101 such as initial program loader (IPL), a RAM (random access memory) 103 serving as a work area of the CPU 101, a flash memory 104 storing various types of data such as terminal programs, image data, and sound data, an SDD (solid state drive) 105 configured to control reading or writing of various types of data with respect to the flash memory 104 based on the control of the CPU 101, a media drive 107 configured to control reading or writing (storing) of data with respect to a recording medium 106 such as a flash memory, an operations button 108 to be operated when selecting a destination of the TV conference-specific terminal 10, a power switch 109 to switch ON/OFF of the power supply of the TV conference-specific terminal 10, and a network I/F (interface) 111 for transmitting data via the communications network 2.

The TV conference-specific terminal 10 further includes a built-in camera 112 configured to image a subject to acquire image data in accordance with the control of the CPU 101, an imaging device I/F 113 configured to control the drive of the camera 112, a built-in microphone 114 configured to input sound, a built-in speaker 115 configured to output sound, a sound input-output I/F 116 configured to process input and output of sound signals between the microphone 114 and the speaker 115 in accordance with the control of the CPU 101, a display I/F 117 configured to transmit image data to an externally attached display 120 in accordance with the control of the CPU 101, an external apparatus connecting I/F 118 for connecting various types of external apparatuses, and a bus line 110 such as an address bus or a data bus for electrically connecting the above-described components illustrated in FIG. 3.

The display 120 is a display part formed of liquid crystal or organic EL (OLED), and configured to display an image of the subject or operational icons. Further, the display 120 is connected to the display I/F 117 via a cable 120c. The cable 120c may be an analog RGB (VGA) signal-specific cable, a component video-specific cable, an high-definition multimedia interface (HDMI) (registered trademark) or a DVI (digital video interactive) signal-specific cable.

The camera 112 includes lenses and a solid-state image sensor configured to convert an image (video) of a subject into electronic data by converting light waves into electric charges. Examples of the solid-state image sensor include a CMOS (complementary metal oxide semiconductor) and a CCD (charge coupled device).

The external apparatus connecting I/F 118 is configured to be connected via a USB (universal serial bus) to external apparatuses such as an external camera, an external microphone, and an external speaker. When the external camera is connected to the external apparatus connecting I/F 118, the external camera is driven in preference to the built-in camera 112 in accordance with the control of the CPU 101. Similarly, when the external microphone or the external speaker is connected to the external apparatus connecting I/F 118, the external microphone or the external speaker connected to the external apparatus connecting I/F 118 is driven in preference to a corresponding one of the built-in microphone 114 and the built-in speaker 115 in accordance with the control of the CPU 101. Note that the TV conference-specific terminal 10 is not necessarily provided with the built-in camera 112, and may be connected to the external camera alone via the external apparatus connecting I/F 118. Similarly, the TV conference-specific terminal 10 is not necessarily provided with the built-in microphone 114 or the built-in speaker 115, and may be connected to the external microphone or the external speaker alone via the external apparatus connecting I/F 118. Moreover, the display 120 of the TV conference-specific terminal 10 is connected to the display I/F 117 via a cable 120*c*, but is not necessarily connected to the display I/F 117. The display 120 may be incorporated in the TV conference-specific terminal 10.

Further, the TV conference-specific terminal 10 may be provided with an external recording medium I/F configured to read an external recording medium such as an SD card or SIM (subscriber identity module) card in addition to the external apparatus connecting I/F 118.

Note that the recording medium 106 is configured to be removable from the TV conference-specific terminal 10. Further, when the recording medium 106 is a nonvolatile memory configured to read or write data in accordance with the control of the CPU 101, such a nonvolatile memory is not limited to the flash memory 104. The nonvolatile memory to be used may be an EEPROM (Electrically Erasable and Programmable ROM), or the like.

Further, the above-described terminal-specific programs may be distributed in a form of a computer-readable recording medium, such as the recording medium 106, and the like storing the programs in files of an installable format or an executable format. Alternatively, the above-described terminal-specific programs may be stored in the ROM 102 instead of the flash memory 104.

Mobile Terminal

Figure 4:
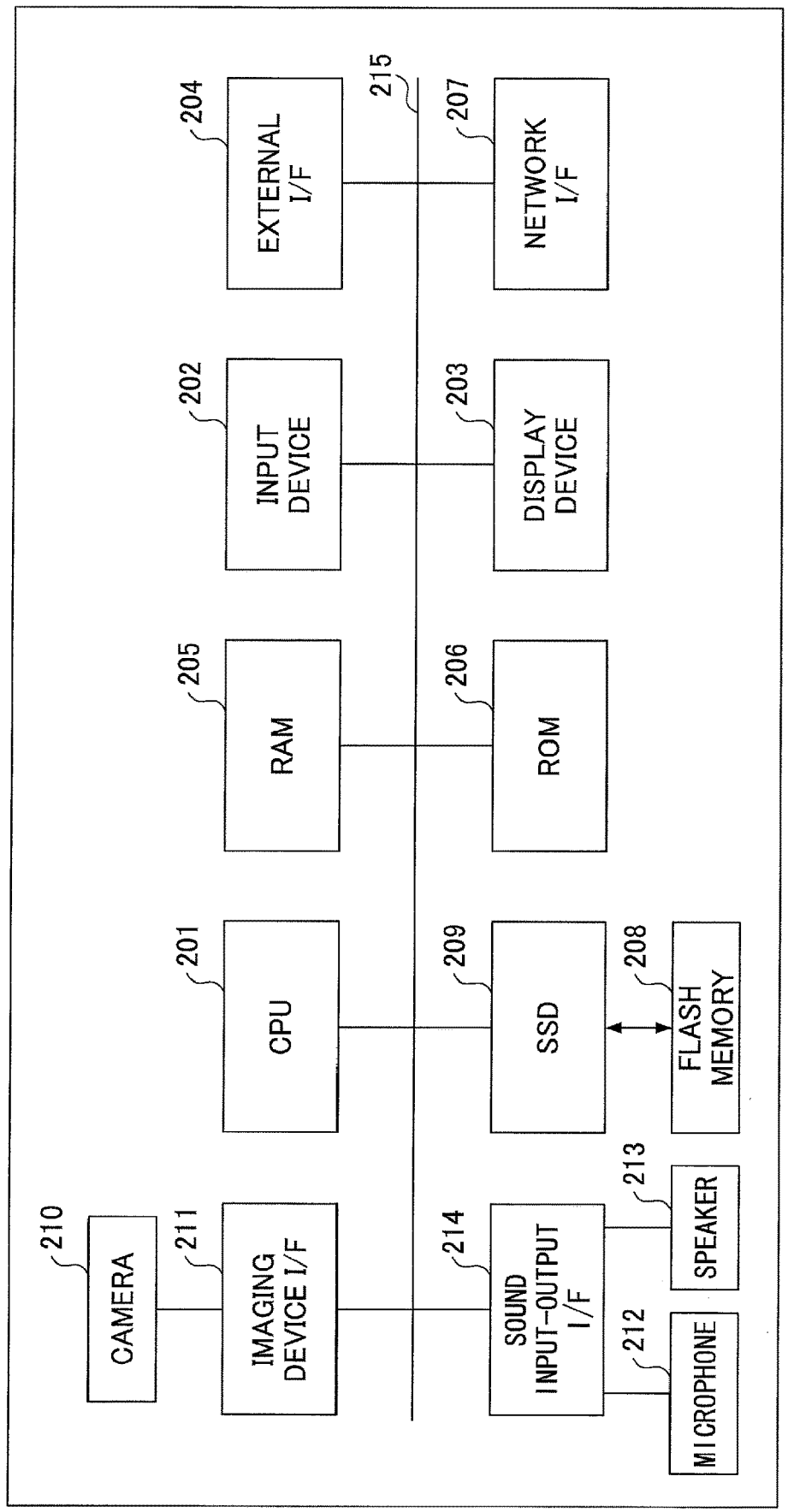
FIG. 4 is a hardware configuration diagram illustrating an example of a mobile terminal according to an embodiment.

FIG. 4 is a hardware configuration diagram illustrating an example of the mobile terminal according to an embodiment. As illustrated in FIG. 4, the mobile terminal 20 according to the embodiment includes a CPU 201 configured to control overall operations of the mobile terminal 20, an input device 202 configured to input various types of signals into the mobile terminal 20, a display device 203 configured to display a process result obtained by the mobile terminal 20, an external I/F 204 serving as an interface between various types of external apparatuses such as an external microphone, an external camera, and an external recording medium, and the mobile terminal 20, a RAM 205 utilized as a work area of the CPU 201, a ROM 206 configured to store programs and data such as settings of the OS of the mobile terminal 20 and network settings, a network I/F 207 configured to transmit data by utilizing a mobile phone communications network, a flash memory 208 configured to store various types of data such as terminal-specific programs, and an SSD 209 configured to control reading or writing of various types of data with respect to the flash memory 208 in accordance with the control of the CPU 201.

Further, the mobile terminal 20 includes a built-in camera 210 configured to image a subject to acquire image data in accordance with the control of the CPU 201, an imaging device I/F 211 configured to control driving of the camera 210, a built-in microphone 212 configured to input sound, a built-in speaker 213 configured to output sound, a sound input-output I/F 214 configured to input/output of sound signals between the microphone 212 and the speaker 213 in accordance with the control of the CPU 201, and a bus line such as an address bus or a data bus configured to electrically connect the above-described components as illustrated in FIG. 4. Note that when the mobile terminal 20 utilizes a text chat service alone, the mobile terminal 20 is not necessarily provided with the camera 210, the microphone 212, the speaker 213, and the like.

Further, when the recording medium 106 is a nonvolatile memory configured to read or write data in accordance with the control of the CPU 101, the recording medium 106 is not limited to the flash memory 208. The recording medium 106 may be an EEPROM (electrically erasable and programmable ROM).

The above-described terminal-specific programs may be distributed in a form of a computer-readable recording medium, such as the recording medium, and the like storing the programs in files of an installable format or an executable format. Alternatively, the above-described terminal-specific programs may be stored in the ROM 206 instead of the flash memory 208.

Figure 5:
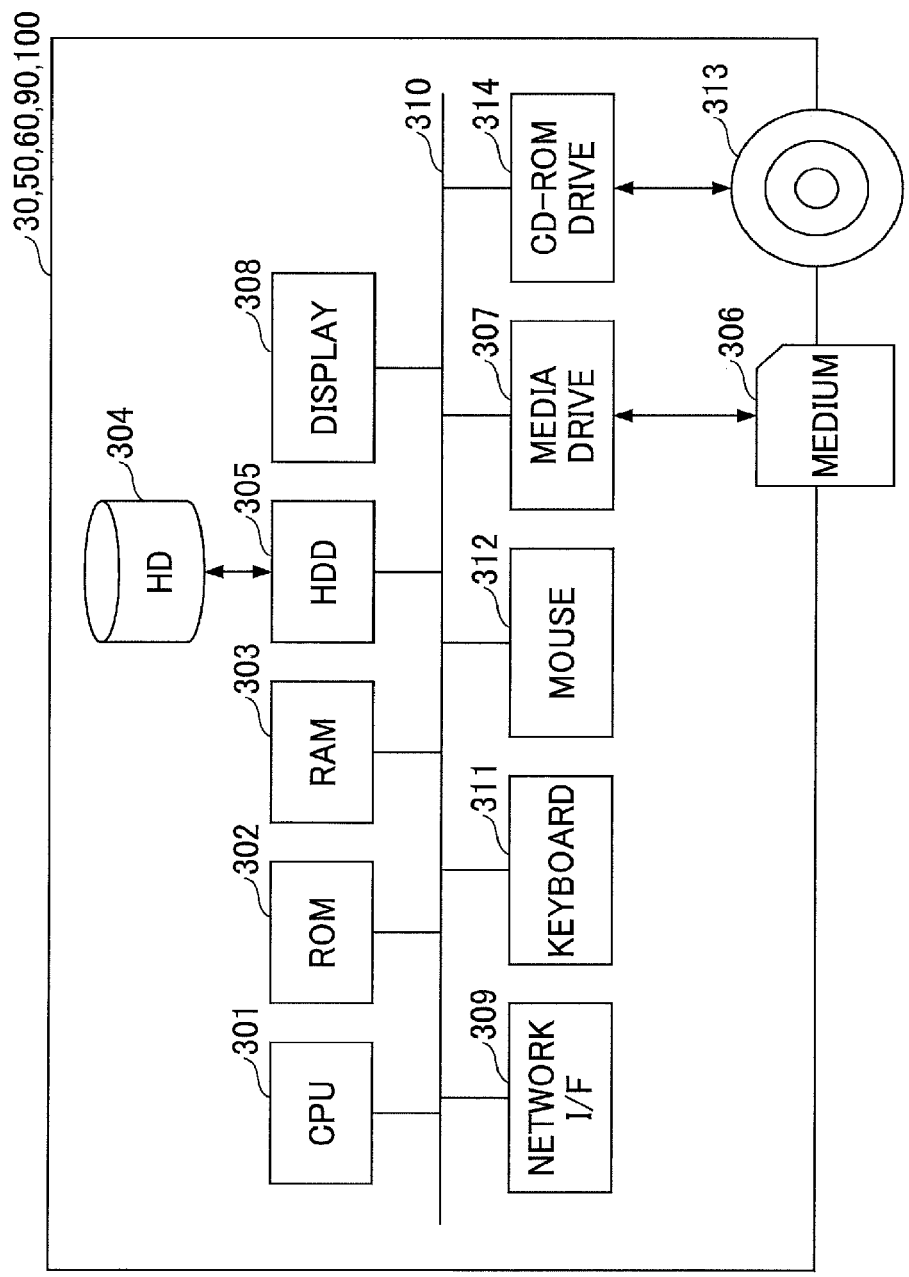
FIG. 5 illustrates a hardware configuration diagram illustrating examples of a relay apparatus, a transmission management system, a service management server, a program providing system, and a maintenance system according to an embodiment.

Relay Apparatus, Transmission Management System, Service Management Server, Program Providing System, and Maintenance System Next, a description is given of hardware configurations of the relay apparatus 30, the transmission management system 50, the service management server 60, the program providing system 90, and the maintenance system 100. FIG. 5 is a hardware configuration diagram of the relay apparatus 30, the transmission management system 50, the service management server 60, the program providing system 90, and the maintenance system 100 according to an embodiment.

The transmission management system 50 includes a CPU 301 configured to control overall operations of the transmission management system 50, a ROM 302 configured to store a program for use in driving the CPU 301 such as an IPL (Initial Program Loader), a RAM 303 configured to serve as a work area of the CPU 301, an HD 304 configured to store data tailored for programs of the transmission management system 50, an HDD (hard disk drive) 305 configured to control reading or writing of the data with respect to the HD 304 in accordance with the control of the CPU 301, a media drive 307 configured to control reading or writing (storing) of data with respect to a recording medium 306 such as flash memory or the like, a display 308 configured to display various types of information such as a cursor, menus, windows, characters, or images, a network I/F 309 configured to perform data communications using the communications network 2, a keyboard 311 provided with multiple keys for inputting characters, numeric values, various types of instructions, and the like, a mouse 312 configured to select or execute various types of instructions, select a process target, and move a cursor, a CD-ROM drive 314 configured to control reading or writing of data with respect to a CD-ROM (compact disc read only memory) as an example of a removable recording medium, and a bus line 310 such as an address bus or a data bus for electrically connecting the above-described components as illustrated in FIG. 5.

Note that the above-described transmission management-specific programs may be distributed in a form of the above-described computer-readable recording medium 306, the CD-ROM 313, and the like storing the programs in files of an installable format or executable format. Alternatively, the above-described transmission management-specific programs may be stored in the ROM 302 instead of the HD 304.

Further, each of the relay apparatus 30 and the service management server 60 has a hardware configuration similar to that of the transmission management system 50, and hence, a duplicated illustration of the relay apparatus 30 and the service management server 60 is omitted from the specification. However, the HD 304 of the relay apparatus 30 stores relay apparatus-specific programs for controlling the relay apparatus 30, and the HD 304 of the service management server 60 stores information management-specific programs for controlling the service management server 60. In this case, the relay apparatus-specific programs and the information management-specific programs may be distributed in a form of the above-described computer-readable recording medium 306, CD-ROM 313, and the like storing the programs in files of an installable format or executable format. Alternatively, the above-described relay apparatus-specific programs and the information management-specific programs may be stored in the ROM 302 instead of the HD 304.

Further, each of the program providing system 90 and the maintenance system 100 has a hardware configuration similar to that of the transmission management system 50, and hence, a duplicated illustration of the program providing system 90 and the maintenance system 100 is omitted from the specification. Note that the HD 304 of the program providing system 90 stores program providing-specific programs for controlling the program providing system 90. In this case, the program providing-specific programs may also be distributed in a form of the above-described computer-readable recording medium 306, the CD-ROM 313 and the like storing the programs in files of an installable format or executable format. Alternatively, the above-described program providing-specific programs may be stored in the ROM 302 instead of the HD 304.

Note that other examples of the removable computer-readable recording medium include a CD-R (compact disc recordable), a DVD (digital versatile disk), a Blu-ray Disc, and the like.

Functional Configuration

Figure 6:
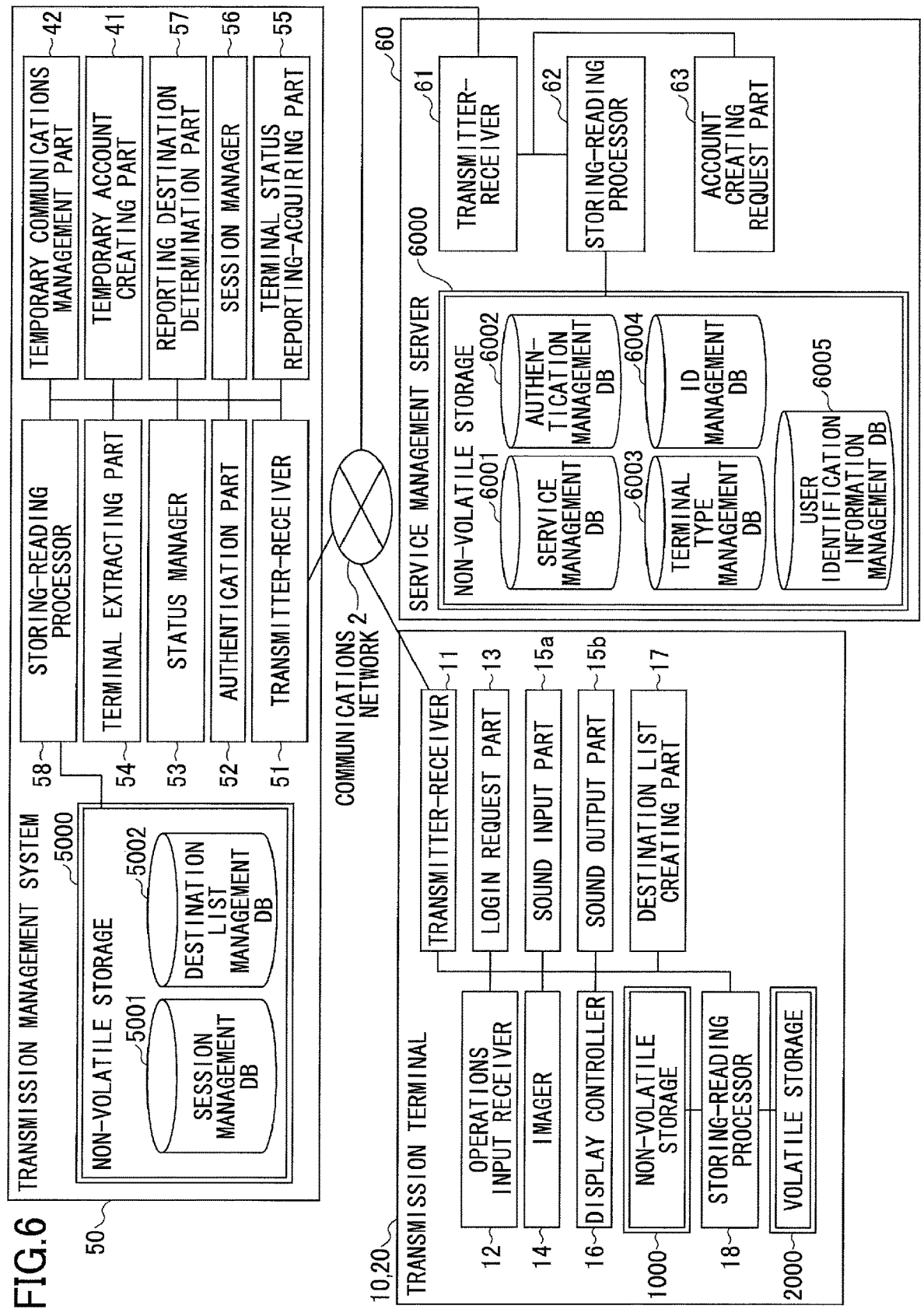
FIG. 6 is a functional block diagram illustrating examples of the transmission terminal, the service management server, and the transmission management system constituting the transmission system 1 according to an embodiment.

Next, a description is given of functional configurations of the embodiment. FIG. 6 is a functional block diagram illustrating each of the terminals, the apparatus, and the system constituting the transmission system 1 according to the embodiment. In FIG. 6, the TV conference-specific terminal 10, the mobile terminal 20, the transmission management system 50, and the service management server 60 are connected via the communications network 2 to perform data communications with one another. Note that the relay apparatus 30, the program providing system 90, and the maintenance system 100 illustrated in FIG. 4 are omitted from FIG. 6 since these components are not directly associated with the embodiment.

Functional Configuration of Terminal

The TV conference-specific terminal 10 includes a transmitter-receiver 11, an operation input receiver 12, a login request part 13, an imager 14, a sound input part 15a, a sound output part 15b, a display controller 16, a destination list creating part 17, and a storing-reading processor 18. In the following, a description is mainly given of a case in which the TV conference-specific terminal 10 serves as the transmission terminal illustrated in FIG. 6.

The above-described components are functional components or functional parts implemented by causing any one of the components illustrated in FIG. 6 to operate based on instructions from the CPU 201 in accordance with the terminal-specific programs loaded from the flash memory 104 in the RAM 103.

Further, the TV conference-specific terminal 10 includes a volatile storage 2000 formed of the RAM 103 illustrated in FIG. 3, and a nonvolatile storage 1000 formed of a flash memory 104 illustrated in FIG. 3.

Next, a detailed description is given of a functional configuration of the TV conference-specific terminal 10 with reference to FIGS. 3 and 6. Note that in the following, an illustration is also given of a relationship with main components of the TV conference-specific terminal 10 among the components illustrated in FIG. 6 for implementing the respective functional components of the TV conference-specific terminal 10.

The transmitter-receiver 11 of the transmission terminal (TV conference-specific terminal) 10 illustrated in FIG. 6 is implemented by instructions from the CPU 101 illustrated in FIG. 3, and the network I/F 111 illustrated in FIG. 2, and configured to perform transmission and reception of various types of data (or information) with respect to other terminals, apparatuses, or systems via the communications network 3. The transmitter-receiver 11 starts receiving status information indicating a status of each of the transmission terminals serving as destination candidates from the TV conference management system $50_1$ before starting communications with a desired destination terminal. Note that the status information not only includes operating statuses (online or offline) of the TV conference-specific terminals 10 and/or the mobile terminals 20, but also includes whether the user of each terminal is currently speaking or currently away from the user's seat even when the operating status is online. Further, the status information also includes various statuses such as the cable 120c is disconnected from the TV conference-specific terminal 10, and sound and image statuses such as failing to display images while outputting sound, or a mute status indicating the setting disabling sound output in addition to the operating statuses of the TV conference-specific terminals 10. In the following, an illustration is given of an example when the status information indicates the operating status. Note that in the above example, when the transmission terminal in FIG. 6 is the mobile terminal 20, the transmitter-receiver 11 starts receiving the status information indicating the status of each of the terminals serving as the destination candidates from the text chat management system $50_2$ before starting the communications with a desired destination terminal.

The operations input receiver 12 of the transmission terminal 10 illustrated in FIG. 6 is implemented by instructions from the CPU 101 illustrated in FIG. 3, and the operations button 108 and the power switch 109 illustrated in FIG. 3, and configured to receive various types of inputs from users. For example, when the user switches the power switch 109 illustrated in FIG. 3 ON, the operations input receiver 12 illustrated in FIG. 6 receives a power ON instruction to switch the power ON. Note that when the transmission terminal in FIG. 6 is the mobile terminal 20, the operations input receiver 12 is implemented by instructions from the CPU 201 illustrated in FIG. 4, and the input device 202.

The login request part 13 of the transmission terminal 10 illustrated in FIG. 6 is implemented by the CPU 101 illustrated in FIG. 2, and is configured to automatically transmit login request information representing an indication to request a login, terminal type information, services accessible to the request source terminal, a current IP address of the request source terminal from the transmitter-receiver 11 to the TV conference management system $50_1$ via the communications network 3, which is triggered by the reception of the power ON instruction. Further, when the user switches the power switch 109 from a power ON status to a power OFF status, the operations input receiver 12 completely switches the power OFF after the transmitter-receiver 11 transmits status information indicating that the power will be switched OFF to the TV conference management system $50_1$. Hence, the TV conference management system $50_1$ may be able to detect change of the power status of the TV conference-specific terminal 10 from the power ON status to the power OFF status.

Note that in the above example, when the transmission terminal in FIG. 6 is the mobile terminal 20, the login request part 13 is implemented by instructions from the CPU 201, and is configured to transmit login request information representing an indication to request a login, terminal type information of the request source terminal, services accessible to the request source terminal, and a current IP address of the request source terminal from the transmitter-receiver 11 to the text chat management system $50_2$ via the communications network 2, which is triggered by the reception of the login operation performed by the user of the mobile terminal 20. As described above, in the mobile terminal 20, the login request and the like are transmitted to the text chat management system $50_2$ by the user's login operation on the programs (terminal-specific programs) installed in the mobile terminal 20.

The imager 14 of the transmission terminal 10 illustrated in FIG. 6 is implemented by instructions from the CPU 101 illustrated in FIG. 3, the camera 112 and the imaging device I/F 113 illustrated in FIG. 3, and is configured to image a subject to output image data acquired by imaging the subject. Note that when the transmission terminal in FIG. 6 is the mobile terminal 20, the imager 14 is implemented by instructions from the CPU 201 illustrated in FIG. 4, the camera 210 and the imaging device I/F 211 illustrated in FIG. 4. However, when the mobile terminal 20 uses the text chat service alone, the mobile terminal 20 does not necessarily have the imager 14.

The sound input part 15a of the transmission terminal 10 illustrated in FIG. 6 is implemented by instructions from the CPU 101 illustrated in FIG. 3, and the sound input-output I/F 116 illustrated in FIG. 3, and is configured to convert sound of the user's voice input by the microphone 114 into sound signals and then input sound data associated with the sound signals. The sound output part 15b of the transmission terminal 10 illustrated in FIG. 6 is implemented by the instructions from the CPU 101 illustrated in FIG. 3, and the sound input-output I/F 116 illustrated in FIG. 3, and is configured to output the sound signals associated with the sound data to the speaker 115 to cause the speaker 115 to output sounds. Note that when the transmission terminal in FIG. 6 is the mobile terminal 20, the sound input part 15a and the sound output part 15b are implemented by instructions from the CPU 201 illustrated in FIG. 4, and the sound input-output I/F 214 illustrated in FIG. 4. However, when the mobile terminal 20 uses the text chat service alone, the mobile terminal 20 does not necessarily have the sound input part 15a and the sound output part 15b.

The display controller 16 of the transmission terminal 10 illustrated in FIG. 6 is implemented by the instructions from the CPU 101 illustrated in FIG. 3, and the display I/F 117 illustrated in FIG. 3, and is configured to control transmission of image data with respect to an externally attached display 120. Note that when the transmission terminal in FIG. 6 is the mobile terminal 20, the display controller 16 illustrated in FIG. 6 is implemented by instructions from the CPU 201 illustrated in FIG. 4, and the display device 203 illustrated in FIG. 4, and is configured to control transmission of image data or the like with respect to the display device 203.

The destination list creating part 17 of the transmission terminal 10 illustrated in FIG. 6 is implemented by instructions from the CPU 101 illustrated in FIG. 3, and is configured to create or update destination lists based on destination list information and status information of the TV conference-specific terminals 10 and/or the mobile terminals 20 serving as the destination candidates received from the transmission management system 50. Note that when the transmission terminal in FIG. 6 is the mobile terminal 20, the destination list creating part 17 is implemented by the CPU 201 illustrated in FIG. 4.

The storing-reading processor 18 of the transmission terminal 10 illustrated in FIG. 6 is implemented by instructions from the CPU 101 illustrated in FIG. 3, executed by the SDD 105 illustrated in FIG. 3, and is configured to store various types of data in the nonvolatile storage 1000 and read various types of data from the nonvolatile storage 1000. The nonvolatile storage 1000 is configured to store a communications ID (identification) and a password corresponding to the communications ID for identifying a TV conference-specific terminal 10 or a user as a communications destination. Note that it is not necessary to store the communications ID and the corresponding password in the nonvolatile storage 1000. In such a case, the communications ID and the corresponding password may be input by the user every time the user transmits a login request to the transmission management system 50.

The storing-reading processor 18 is further configured to store various types of data in the volatile storage 2000, and read various types of data from the volatile storage 2000. The volatile storage 2000 overwrites and stores image data or sound data received by performing communications with the destination terminal, and overwrites the stored image data or sound data every time the volatile storage 2000 receives the image data or sound data. Among these data, images based on the image data before being overwritten are displayed on the display 120, and sounds based on the sound data before being overwritten are output from the speaker 15. Note that in the above example, when the transmission terminal in FIG. 6 is the mobile terminal 20, the storing-reading processor 18 is implemented by instructions from the CPU 201 illustrated in FIG. 4, and the SSD 209 illustrated in FIG. 4. Further, the volatile storage 2000 also stores the text data received by performing a text chat with the destination terminal.

Functional Configuration of Transmission Management System

The transmission management system 50 includes a transmitter-receiver 51, an authentication part 52, a status manager 53, a terminal extracting part 54, a terminal status reporting-acquiring part 55, a session manager 56, a reporting destination determination part 57, a temporary account creating part 41, a temporary communications management part 42, and a storing-reading processor 58. The above-described components are functional components or functional parts implemented by causing any one of the components illustrated in FIG. 6 to operate instructions from the CPU 301 in accordance with the authentication management server programs loaded from the HD 304 in the RAM 303 illustrated in FIG. 5. Further, the transmission management server 50 includes a nonvolatile storage 5000 configured to maintain various types of data (or information) stored even though the power of the transmission management server 50 is switched OFF. The nonvolatile storage 5000 is formed of the HD 304 illustrated in FIG. 5.

Session Management Table

Further, the nonvolatile storage 5000 includes a session management DB 5001 composed of a session management table illustrated in FIG. 7. In the session management table, the relay apparatus ID of the relay apparatus 30 used for relaying data, the communications ID of the request source terminal, and the communications ID of the destination terminal are managed in association with each of the session IDs. For example, in the session management table illustrated in FIG. 7, the relay apparatus 30a (the relay apparatus ID "111a") selected based on the session ID "sel" relays data between the request source terminal (the mobile terminal 02aa) having the communications ID "02aa" and the destination terminal (the TV conference-specific terminal 10ab) having the communications ID "01ab".

Destination List Management Table

Further, the nonvolatile storage 5000 includes a destination list management DB 5002 composed of destination list management tables illustrated in FIGS. 8A and 8B.

FIG. 8A is an example of the destination list management table registering destination information managed by the TV conference management system $50_1$. FIG. 8B is an example of the destination list management table registering destination information managed by the text chat management system $50_2$. These destination list management tables are designed to manage all the communications IDs of the destination terminals registered as destination terminal candidates in association with the communications ID of the request source terminal that has requested starting (calling) of the connection in the TV conference service or the text chat service. Further, the communications IDs of the destination terminals are provided with information about the respective management systems 50 managing call control of the destination terminals after the "@" mark of the communications IDs. For example, the destination list management table managed by the TV conference management system $50_1$ illustrated in FIG. 8A indicates that destination terminal candidates capable of transmitting a connection start request for using the TV conference service from the request source terminal (the TV conference-specific terminal 10ab) having the communications ID "01ab" include the TV conference-specific terminal 10ab having the communications ID "01aa" managed by the TV conference management system $50_1$, and the mobile terminal 20aa having the user ID "02AA" managed by the text chat management system $50_2$.

On the other hand, the destination list management table managed by the text chat management system $50_2$ illustrated in FIG. 8B indicates that destination terminal candidates capable of transmitting a connection start request for using the TV conference service or the text chat service from the request source terminal (the mobile terminal 20aa) having the user ID "02AA" include the mobile terminal 20ab having the user ID "02AB" managed by the text chat management system $50_2$, and the TV conference-specific terminal 10ab having the communications ID "01ab" managed by the TV conference management system $50_1$. Note that the even though the destination terminals are managed in the destination lists, the connection start request is unable to be transmitted for the services unavailable to the destination terminals. For example, the mobile terminal 20aa having the user ID "02AA" is unable to transmit a connection start request for using the text chat service (but is able to transmit a connection start request for using the TV conference service) to the destination terminal having the communications ID "01ab".

Note that the description after the "@" mark illustrated in FIGS. 8A and 8B may be domain information (domain names) corresponding to the transmission management systems 50.

Next, an illustration is given of respective functional components of the transmission management system 50. Note that in the following, an illustration is also given of a relationship with main components illustrated in FIG. 6 for implementing the functional components of the transmission management system 50.

The transmitter-receiver 51 of the transmission management system 50 illustrated in FIG. 6 is implemented by instructions from the CPU 301 illustrated in FIG. 5, executed by the network I/F 309 illustrated in FIG. 5, and is configured to perform transmission and reception of various types of data (or information) with respect to other terminals, apparatuses, or servers via the communications network 2.

The authentication part 52 of the transmission management system 50 illustrated in FIG. 6 is implemented by instructions from the CPU 301 illustrated in FIG. 5, executed by the network I/F 309 illustrated in FIG. 5, and is configured to search the authentication management DB 6002 of the service management server 60 for the communications ID and the password included in the login request information received via the transmitter-receiver 51, and perform authentication by determining whether the communications ID and the password identical to those included in the login request information are managed in the authentication management DB 6002.

The status manager 53 of the transmission management system 50 illustrated in FIG. 8 is implemented by instructions from the CPU 301 illustrated in FIG. 5, and is configured to store an operating status of the request source terminal that has transmitted the login request in association with the communications ID and the like of the request source terminal in the ID management DB 6004 of the service management server 60 to manage the operating status of the request source terminal.

The terminal extracting part 54 of the transmission management system 50 illustrated in FIG. 6 is implemented by instructions from the CPU 301 illustrated in FIG. 5, is configured to search the destination list management DB 5002 for the communications ID of the request source terminal that has transmitted the login request as a key, and read the communications IDs of the destination terminal candidates capable of being connected to the request source terminal, and information about the transmission management system 50 that manages calling control of the transmission terminals having the read communications IDs.

The terminal status reporting-acquiring part 55 of the transmission management system 50 illustrated in FIG. 6 is implemented by instructions from the CPU 301 illustrated in FIG. 5, and is configured to acquire the operation statuses of the transmission terminals managed by the transmission management system 50 itself among those of the destination terminal candidates extracted by the terminal extracting part 54 having the communications IDs. Further, the terminal status reporting-acquiring part 55 is configured to report the received operating status of the request source terminal to the terminals serving as the destination candidates.

The session manager 56 of the transmission management system 50 illustrated in FIG. 6 is implemented by instructions from the CPU 301 illustrated in FIG. 5, and is configured to store in the session management DB 5000 of the nonvolatile storage 5001 the relay apparatus ID of the relay apparatus 30 that relays content data in association with the session ID, the communications ID of the request source terminal, and the communications ID of the destination terminal.

The reporting destination determination part 57 of the transmission management system 50 illustrated in FIG. 6 is implemented by instructions from the CPU 301 illustrated in FIG. 5, and is configured to determine the transmission management system 50 to which the operating status of the request source terminal is reported based on the service name included in the login request from the request source terminal. For example, when the mobile terminal 20 allowed to use the TV conference service has logged into the text chat management system 50$_2$, the reporting destination determination part 57 determines that the operating status of the mobile terminal 20 is reported to the TV conference management system 50$_1$. Hence, it may be possible to report or acquire status information such as the operating statuses of the transmission terminals that are allowed to use different services managed by different call controls.

The temporary account creating part 41 of the transmission management system 50 illustrated in FIG. 6 is implemented by instructions from the CPU 301 illustrated in FIG. 5, and is configured to temporarily create an account in response to a request from the service management server 60. The account may be referred to as unique identification information, password, and a user name; however, the temporary account creating part 41 at least creates the identification information. In this embodiment, the temporary account creating part 41 is configured to create the communications ID of the TV conference management system 50$_1$ as the identification information.

The temporary account is created in this example because the account is not necessary for permanent use; however, the temporary account does not need to be a special account composed of the numbers or the like differing from those used in an ordinary account. However, the temporary account may be composed of the numbers or the like differing from the ordinary account to be distinct from the ordinary account. Note that the communications ID is created in the following embodiment; however, the user ID may be created instead of the communications ID.

The temporary communications management part 42 establishes the communications between the transmission terminals using a temporary account. That is, the temporary communications management part 42 may register statuses between the transmission terminals in the ID management table to manage the statuses, or establish sessions to register the sessions in the session management table.

The storing-reading processor 58 of the transmission management system 50 illustrated in FIG. 6 is implemented by instructions from the CPU 301 illustrated in FIG. 5, executed by the HDD 305 illustrated in FIG. 5, is configured to store various types of data in the nonvolatile storage 5000, and read various types of data from the nonvolatile storage 5000.

Functional Configuration of Service Management Server

The service management server 60 includes a transmitter-receiver 61, an account creating request part 63, and a storing-reading processor 62. The above-described components are functional components or functional parts implemented by causing any one of the components illustrated in FIG. 5 to operate instructions from the CPU 301 in accordance with the management system programs loaded from the HD 304 in the RAM 303. Further, the service management server 60 includes a nonvolatile storage 6000 configured to maintain various types of data (or information) stored even though the power of the service management server 60 is switched OFF. The nonvolatile storage 6000 is formed of the HD 304 illustrated in FIG. 7.

Service Management Table

The nonvolatile storage 6000 includes a service management DB 6001 composed of a service management table illustrated in FIG. 9. In the service management table, each of names of the transmission management systems that perform call control of the respective services are managed in association with a corresponding one of the service names of the transmission system 1. For example, in the service management table illustrated in FIG. 9, the service name "TV conference" indicating call control is managed by the transmission management system having a name "TV conference management system" (the transmission management system 50$_1$). Similarly, the service name "text chat" indicating call control is managed by the transmission management system having a name "text chat management system" (the transmission management system 50$_2$).

Note that the management system names illustrated in FIG. 9 may be domain information (domain names) corresponding to the transmission management systems 50.

Authentication Management Table

Further, the nonvolatile storage 6000 includes an authentication management DB 6002 composed of an authentication management tables illustrated in FIGS. 10A and 10B. In the authentication management table in FIG. 10A, each of the communications IDs of all the transmission terminals (TV conference-specific terminals 10 and the mobile terminals 20) managed by the TV conference management system 501 is managed in association with a corresponding one of the passwords. For example, in the terminal authentication management table illustrated in FIG. 10A, the communications ID of the TV conference-specific terminal 10*aa* is "01aa", and the corresponding password is "aaaa".

The ID creating authorization indicates whether the user having the communications ID has authorization to create a communications ID for the communications partner who is currently in communications with the user during the use of the text chat service. The authentication management table or the ID creating authorization is an example of permission information.

Similarly, in the authentication management table in FIG. 10B, the communications IDs of the transmission terminals (TV conference-specific terminals 10 and the mobile terminals 20) managed by the TV conference management system 50$_2$ are managed in association with the corresponding one of the passwords.

Terminal Type Management Table

Further, the nonvolatile storage 6000 includes a terminal type management DB 6003 composed of a terminal type management table illustrated in FIG. 11. In the terminal type management table, the terminal type names of the transmission terminals forming the transmission system 1 are managed in association with the corresponding service names available to the terminals of these types. For example, in the terminal type table illustrated in FIG. 11, the terminals having the terminal type name "TV conference-specific" may be able to use the service having the service name "TV conference". Similarly, the terminals having the terminal type name "general-purpose" may be able to use the service having the service name "TV conference" and the service having the service name "text chat". Further, the terminals having the terminal type name "chat-specific" may be able to use the service having the service name "text chat".

Note that in this embodiment, the terminal type name of the TV conference-specific terminals 10 is "TV conference-specific", and the terminal type name of the mobile terminals 20 is "general-purpose". Note that the mobile terminals 20 having installed the program for utilizing the text chat service alone may serve as the terminals having the terminal type name "chat-specific". Similarly, the mobile terminals 20 having installed the program for utilizing the TV conference service alone may serve as the terminals having the terminal type name "TV conference-specific". Thus, the mobile terminals 20 may be able to serve as the terminals of different terminal types in accordance with the different types of terminal-specific programs installed.

ID Management Table

The nonvolatile storage 6000 further includes a ID management DB 6004 composed of an ID management table illustrated in FIG. 12. In the ID management table, a name of the terminal when the communications ID or the user ID of the terminal is specified as a destination, an operating status of the terminal, a reporting destination of the operating status, received date and time at which the login information is received by the transmission management system 50, and an IP address of the terminal are managed in association with each of the communications IDs or user IDs of the terminals forming the transmission system 1. For example, in the ID management table illustrated in FIG. 12, the TV conference-specific terminal 10*aa* having the communications ID "01aa" has a name "AA conference terminal", the operating status "online (communicative)", the reporting destination "-", the received date and time "2013.11.10.13:40" at which the login request information is received by the transmission management system 50 (the TV conference management system 50$_1$), and the IP address "1.2.1.3". Note that when the reporting destination has "-" (no setting), the operating status of the terminal is not transmitted to another transmission management system 50. That is, the operating status of the terminal is transmitted to the transmission management system 50 only when the terminal has transmitted the login request. In the above example, the operating status of the TV conference-specific terminal 10*aa* is reported only to the transmission management system 50$_1$ (TV conference management system).

Meanwhile, the mobile terminal 20*aa* having the communications ID "02AA" has a name "AA mobile terminal", the operating status "online (communicative)", the reporting destination "TV conference management system", the received date and time "2013.11.25.14:30" at which the login request information is received by the transmission management system 50 (the text chat management system 50$_2$), and the IP address "1.4.1.1". Note that when the reporting destination is set, the operating status of the terminal is reported to the other transmission management system 50 set as the reporting destination. In the above example, the operating status of the mobile terminal 20*aa* is reported only to the transmission management system 50$_1$ (TV conference management system). Note that multiple reporting destinations such as "TV conference management system, XXX management system, etc." may be set as the reporting destination.

User Identification Information Management Table

Further, the nonvolatile storage 6000 includes a user identification information management DB 6005 composed of a user identification information management table illustrated in FIG. 13. In the user identification information management table, the user IDs of the user identification information in the text chat service and the communications IDs for identifying users in the TV conference service are managed in association with the respective management IDs. The user identification information management table is an example of registered information.

The user IDs and the communications IDs are basically associated with one another on the one-to-one basis; however, one user ID may be associated with multiple communications IDs. In the user identification information management table, it is possible to read the communications ID in association with the user ID of the user who has input the text message via the text chat service.

Next, an illustration is given of functional configurations of the service management server 60. Note that in the following, an illustration is also given of a relationship with main components among the components illustrated in FIG. 6 for implementing the functional configurations of the service management server 60.

The transmitter-receiver 61 of the service management server 60 illustrated in FIG. 6 is implemented by instructions from the CPU 301 illustrated in FIG. 5, and executed by the network I/F 309 illustrated in FIG. 5, and is configured to perform transmission and reception of various types of data (or information) with respect to the transmission management systems 50 via the communications network 2.

The account creating request part 63 of the service management server 60 illustrated in FIG. 6 is implemented by instructions from the CPU 301 illustrated in FIG. 5, and is configured to determine whether the communications ID is registered in association with the user ID in the user identification information management table of the user identification information management DB 6005. When the communications ID is registered in association with the user ID in the user identification information management table of the user identification information management DB 6005, the account creating request part 63 transmits the communications ID in association with the user ID to the TV conference management system 50$_1$. When the communications ID is not registered in association with the user ID in the user identification information management table of the user identification information management DB 6005, the account creating request part 63 transmits a temporary account creating request to the TV conference management system 50$_1$. Further, when the communications using the temporary account ends, the account creating request part 63 transmits a temporary account deleting request to the TV conference management system 50$_1$.

The storing-reading processor 62 of the transmission management system 50 illustrated in FIG. 6 is implemented by instructions from the CPU 301 illustrated in FIG. 5, and executed by the HDD 305 illustrated in FIG. 5, and is configured to store various types of data in the nonvolatile storage 6000, and read various types of data from the nonvolatile storage 6000.

Details of Process

Login, Display of Destination List, Establishment of Session

Figure 14:
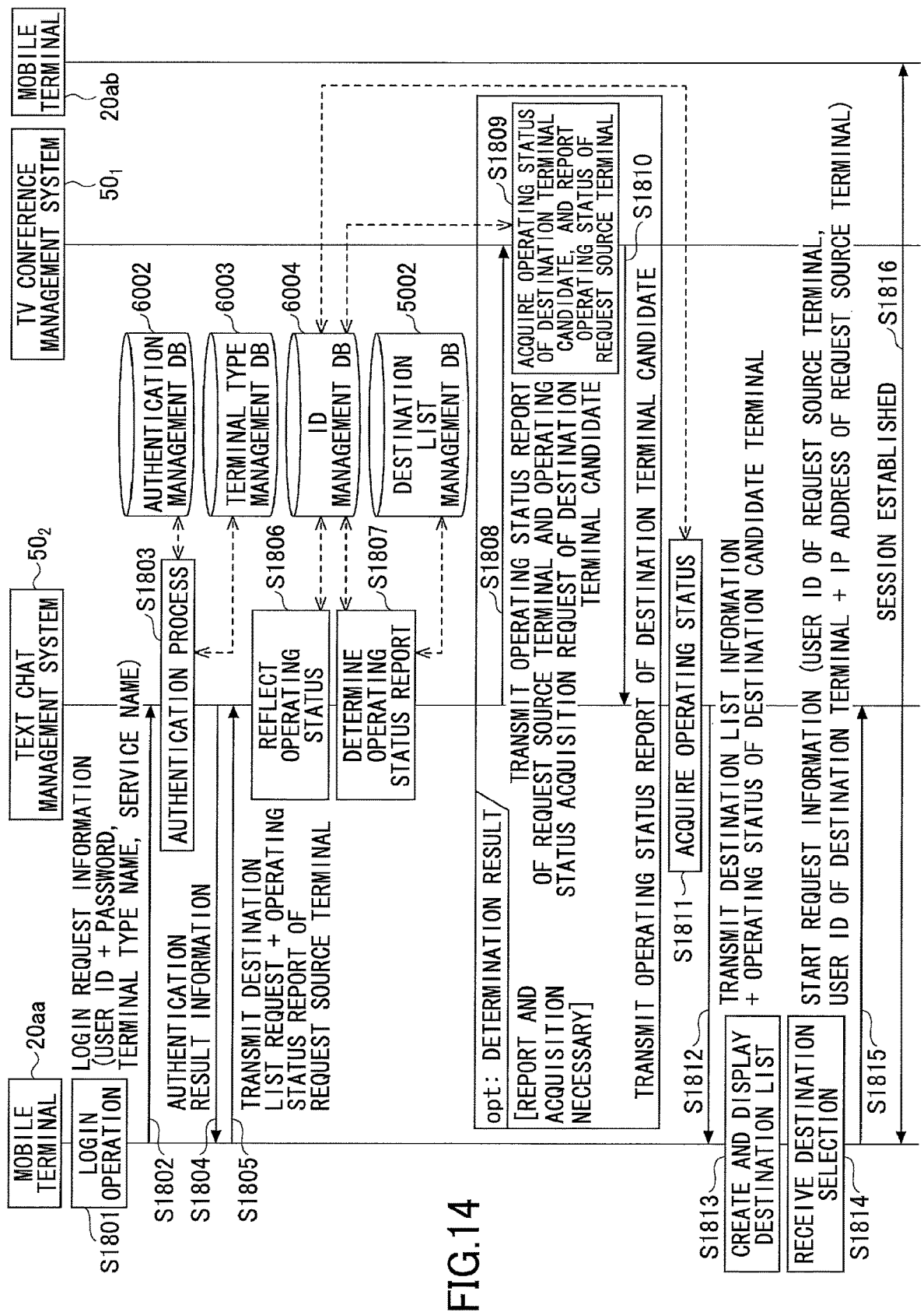
FIG. 14 is a sequence diagram illustrating an example of a process from a TV conference-specific terminal login step to a destination list display step according to an embodiment.

In the following, a description is given, with reference to FIG. 14, of a detailed process of displaying a certain destination list composed of destination terminal candidates for the mobile terminal 20*aa* by a user operating the mobile terminal 20*aa*. FIG. 14 is a sequence diagram illustrating an example of an example of a process from a mobile terminal login step to a destination list display step according to an embodiment.

The user performs a login operation via the mobile terminal 20 via the input device 202 (step S1801).

The operations input receiver 12 of the mobile terminal 20 receives the login operation and transmits login request information to the text chat management system 50$_2$ (step S1802). This login request information includes a user ID and a password for identifying the mobile terminal 20aa of the user's own terminal serving as a request source terminal. Further, the login request information includes a terminal type name, and service names of the mobile terminal 20aa. Note that the user ID and the password are input from the user via the operations input receiver 12 when the user performs a login operation. Note that when the login request information is transmitted from the mobile terminal 20aa to the text chat management system 50$_2$, the text chat management system 50$_2$ serving as the receiver may be able to detect the IP address of the mobile terminal 20aa serving as a transmitter.

In the following description, it is assumed that the terminal type name and the service names included in the login request information transmitted by the mobile terminal 20aa are "general-purpose" and "TV conference and text chat", respectively.

Subsequently, when the authentication part 52 of the text chat management system 50$_2$ receives the login request information via the transmitter-receiver 51, the authentication part 52 performs an authentication process (step S1803). The authentication process indicates a process of determining whether the user ID and password transmitted from the mobile terminal 20aa are registered in the authentication management table. In the following description, it is assumed that the authentication is established.

The transmitter-receiver 51 of the text chat management system 50$_2$ transmits an authentication result generated in the authentication process of the step S1803 (step S1804). In the following description, it is assumed that the text chat management system 50$_2$ has transmitted the authentication result indicating a successful login to the mobile terminal 20aa. Note that when the mobile terminal 20aa receives the authentication information indicating login failure from the text chat management system 50$_2$, the mobile terminal 20aa displays a screen indicating the login failure on the display device 203 of the mobile terminal 20aa and ends the process.

Subsequently, the transmitter-receiver 11 of the mobile terminal 20aa receives the authentication result indicating the successful login from the text chat management system 50$_2$, the mobile terminal 20aa transmits a destination list request and a report of an operating status of the mobile terminal 20aa (step S1805). Note that the operating status of the mobile terminal 20aa is information indicating the operating status being "online (communicative)". However, in a state where the mobile terminal 20aa the operating status of which is online fails to perform communications with other transmission terminals for some reasons, such information may indicate "online (communication disabled)" or the like.

Subsequently, the status manager 53 of the text chat management system 50$_2$ changes the operating status of the request source terminal (the mobile terminal 20aa) in the ID management DB 6004 of the service management server 60 into "online (communicative)" (step S1806).

Figure 15:
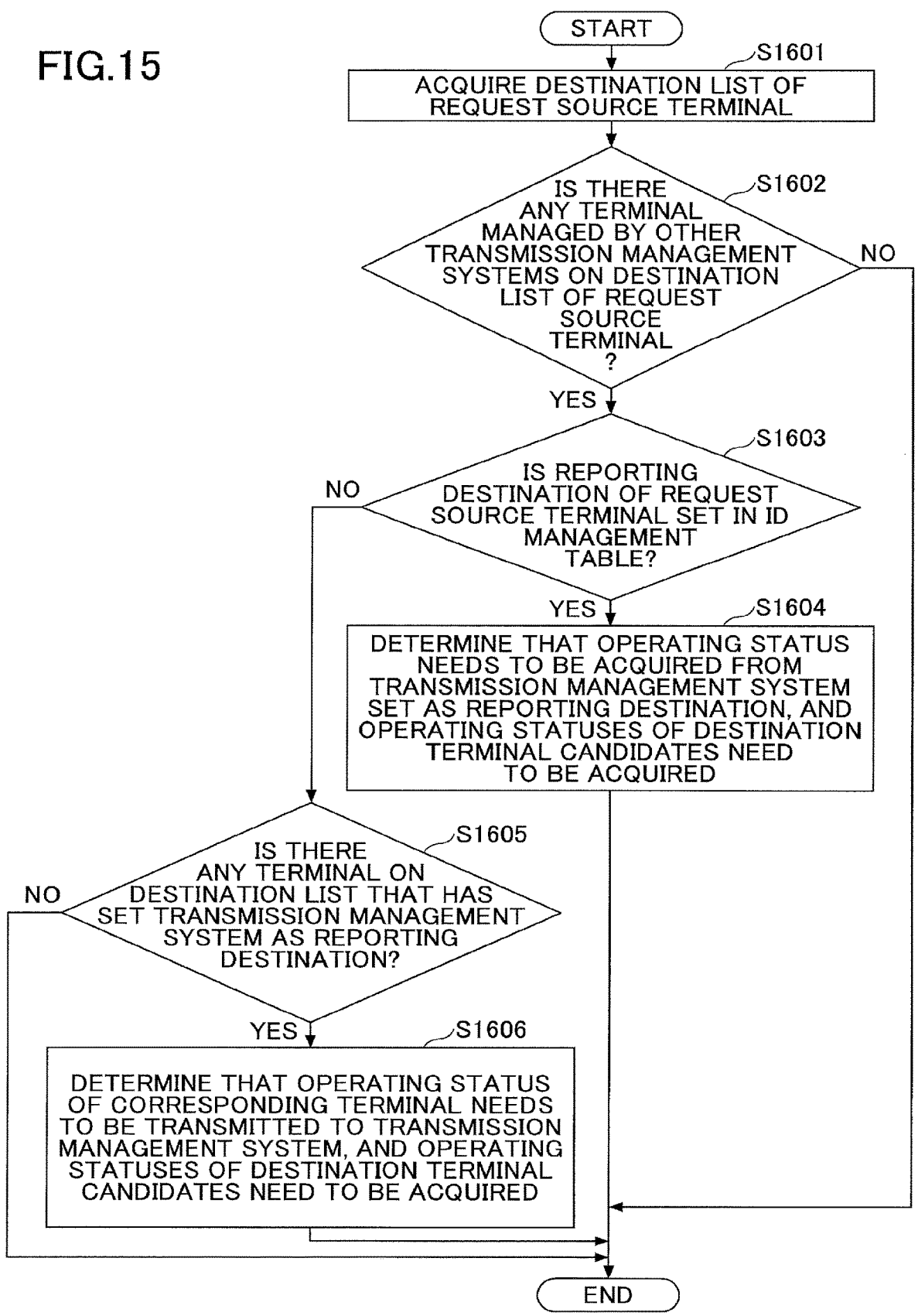
FIG. 15 is a flowchart illustrating an example of an operating status report determination process according to an embodiment.

Then, the text chat management system 50$_2$ performs a process of determining the operating status report (an operating status report determination process) (step S1807). The process of determining the operating status report will be described with reference to FIG. 15. FIG. 15 is a flowchart illustrating an example of an operating status report determination process according to an embodiment.

The terminal extracting part 54 of the text chat management system 50$_2$ acquires a destination list of the request source terminal (the mobile terminal 20aa) from the destination list management table of the destination list management DB 5002 (step S1601).

Next, the reporting destination determination part 57 of the text chat management system 50$_2$ determines whether there are any transmission terminals managed by other transmission systems 50 in the destination list acquired in step S1061 (step S1602).

In this example, the destination list of the mobile terminal 20aa (the user ID "02AA") includes "02AB@text chat management system" and "01ab@TV conference management system". Hence, since there is a TV conference-specific terminal 10ab having the communications ID "01ab" managed by the TV conference management system 50$_1$, step S1603 is processed.

Note that in a case where there is no transmission terminal managed by another transmission management system 50, the process of FIG. 15 ends. That is, in this case, all the destination terminal candidates included in the acquired destination list are the transmission terminals managed by the text chat management system 50$_2$. Hence, the reporting destination determination part 57 of the text chat management system 50$_2$ determines that it is not necessary to transmit a report of the operating status of the request source terminal, or acquire the operation statuses from another transmission management system 50.

Subsequently, the reporting destination determination part 57 of the text chat management system 50$_2$ determines whether the reporting destination with respect to the request source terminal (the mobile terminal 20aa) is set in the ID management table (step S1603).

In this example, since the "TV conference management system" is set as the reporting destination of the mobile terminal (the communications ID "02aa") in the ID management table, step S1604 is processed.

Subsequently, the reporting destination determination part 57 of the text chat management system 50$_2$ determines that the operating status of the request source terminal needs to be transmitted to another transmission management system 50 (the TV conference management system 50$_1$) set as the reporting destination of the request source terminal in the ID management table, and also that the operating statuses of the destination terminal candidates need to be acquired, and then ends the process (step S1604). As described above, when the reporting destination of the request source terminal is set in the ID management table, the reporting destination determination part 57 determines that the operating status of the request source terminal needs to be transmitted to the reporting destination, and that the operating statuses of the destination terminal candidates of the request source terminal need to be acquired.

When the determination in step S1603 is "NO", step S1605 is processed. The reporting destination determination part 57 of the text chat management system 50$_2$ determines whether there are destination terminal candidates that have set the text chat management system 50$_2$ as the reporting destination in the ID management table on the destination list of the request source terminal (step S1605).

Subsequently, the reporting destination determination part 57 of the text chat management system 50$_2$ determines that the operating status of the request source terminal needs to be reported to the transmission management system 50 that manages the destination terminal candidates setting the text chat management system 50₂ as the reporting destination, and that the operating statuses of the destination terminal candidates of the request source terminal need to be acquired (step S1606).

Subsequently, the following description is given by referring back to FIG. 14. In the operating status report determination process in step S1807 illustrated with reference to FIG. 15, when it is determined that the operating status needs to be reported and acquired with respect to another transmission management system 50, steps S1808 to S1810 are processed. In this example, since it is determined that the operating status needs to be reported and acquired with respect to the TV conference management system 50₁ as described above, steps S1808 to S1810 are processed.

Initially, the transmitter-receiver 51 of the text chat management system 50₂ transmits an acquisition request of the operating status "online (communicative)" of the request source terminal (the mobile terminal 20*aa*), and an acquisition request of the operating status of the corresponding destination terminal candidate (the TV conference-specific terminal 10*ab*) to the TV conference management system 50₁ (step S1808).

Subsequently, when the terminal status reporting-acquiring part 55 of the TV conference management system 50₁ receives the operating status of the request source terminal and the acquisition request of the operating status of the corresponding destination terminal candidate, the terminal status reporting-acquiring part 55 acquires the operating status of the destination terminal candidate, and reports the operating status of the request source terminal to the destination terminal candidate (step S1809). Note that the operating status of the request source terminal is reported to the destination terminal candidate only when the operating status of the destination terminal candidate is "online".

In this case, the terminal status reporting-acquiring part 55 of the TV conference management system 50₁ acquires the operating status of the TV conference-specific terminal 10*ab* (the communications ID "01ab") serving as the destination terminal candidate from the ID management DB 6004. Since the operating status of the TV conference-specific terminal 10*ab* is "offline", the operating status of the request source terminal (the mobile terminal 20*aa*) is not reported to the TV conference-specific terminal 10*ab*.

Subsequently, the transmitter-receiver 51 of the text chat management system 50₂ reports the operating status of the destination terminal candidate (the TV conference-specific terminal 10*ab*) to the text chat management system 50₂ (step S1810).

The terminal status reporting-acquiring part 55 of the text chat management system 50₂ acquires the operating status of the transmission terminal managed by itself (the text chat management system 50₂), among the destination terminal candidates of the request source terminal (the mobile terminal 20*aa*), from the ID management DB 6004 (step S1811). In this case, the terminal status reporting-acquiring part 55 of the text chat management system 50₂ acquires the operating status of the mobile terminal 20*ab* (the user ID "02AB") managed by itself (the text chat management system 50₂), among the destination terminal candidates of the mobile terminal 20*aa*, from the ID management DB 6004.

Then, the transmitter-receiver 51 of the text chat management system 50₂ transmits the destination list information (the communications ID of the destination terminal candidate, etc.), and the operating statuses of the destination terminal candidates acquired in steps S1810 and 1811 to the request source terminal (the mobile terminal 20*aa*) (step S1812). In this example, the transmitter-receiver 51 transmits the destination list information of the mobile terminal 20*aa* serving as the request source terminal, and the operating statuses of the mobile terminal 20*ab* and the TV conference-specific terminal 10*ab* serving as the destination terminal candidates included in the destination list to the mobile terminal 20*aa*.

When the destination list creating part 17 of the mobile terminal 20*aa* receives the destination list information and the operating statuses of the destination terminal candidates from the text chat management system 50₂, the destination list creating part 17 creates a destination list and displays the destination list on the display device 203 (step S1813). Note that the destination list illustrated in FIG. 16 may be displayed on the display device 203 of the mobile terminal 20*aa*.

Figure 16:
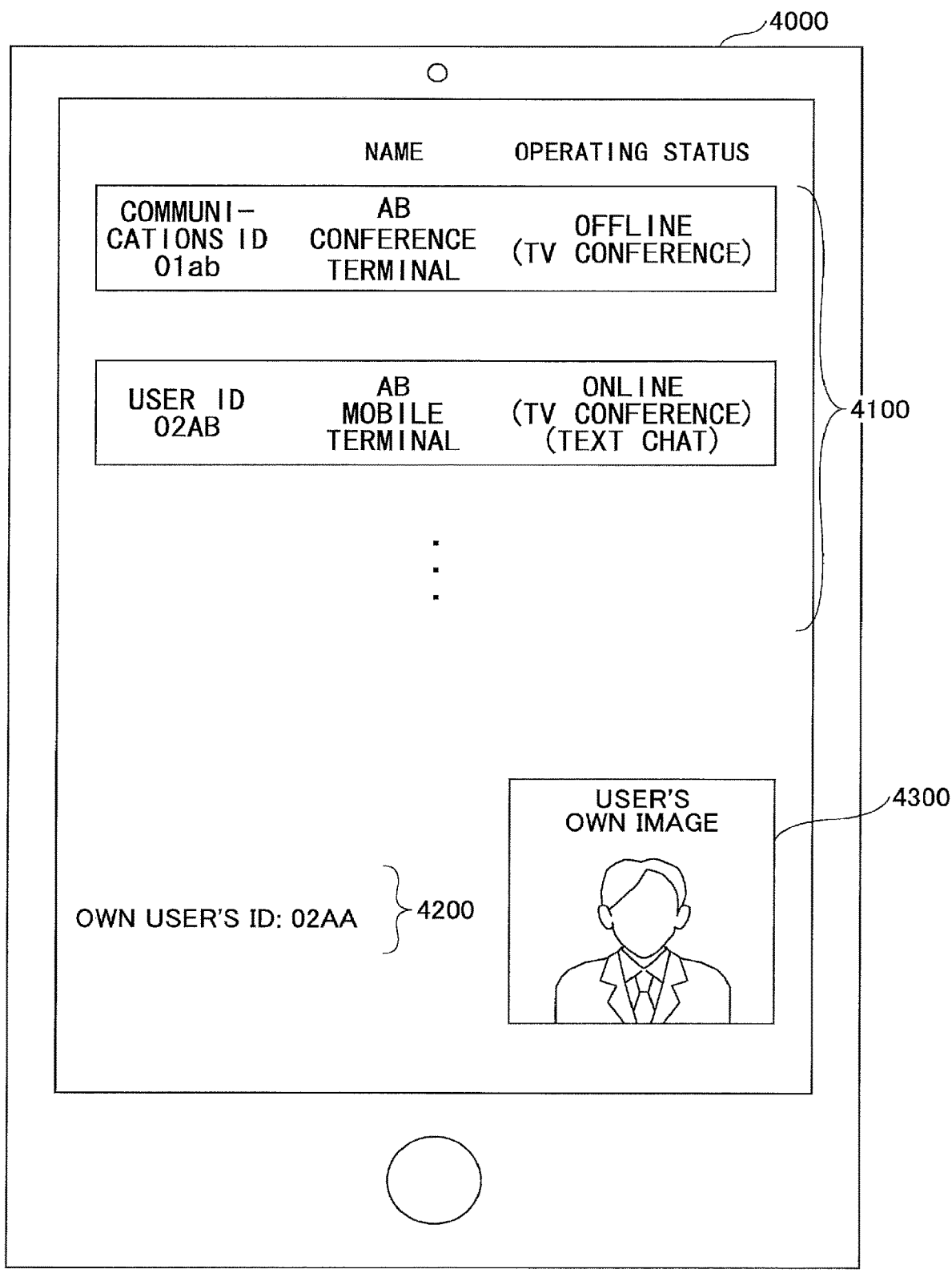
FIG. 16 is an image diagram illustrating an example of the destination list display screen displayed on the TV conference-specific terminal.

FIG. 16 is an image diagram illustrating an example of the destination list display screen displayed on the mobile terminal. The destination list display screen 4000 illustrated in FIG. 16 includes a destination list 4100, the communications ID 4200 of the own terminal, and an image display 4300 imaged by the own terminal. The destination list 4100 displays a list of the transmission terminals serving as the destination terminal candidates of the mobile terminal 20*aa*. The list of the destination terminal candidates displays the communications IDs, the user IDs, names, the operating statuses of the destination terminal candidates, and the services (TV conference, text chat) available to the destination terminal candidates.

The communications ID 4200 indicates the user ID of the mobile terminal 20*aa* that displays the destination list display screen 4000. The image display 4300 displays an image imaged by the camera 210 of the mobile terminal 20*aa* that displays the destination list display screen 4000.

The user of the mobile terminal 20*aa* may be able to select a desired one of the transmission terminals that the user wishes to perform communications with from the destination list 4100 of the destination list display screen 4000 so as to perform the TV conference or the text chat with the selected transmission terminal. Note that among the destination terminal candidates displayed on the destination list 4100, the transmission terminal having the operating status of the transmission terminal being "offline" or the transmission terminal that is engaged in the communications with another transmission terminal even when the operating status is "online", the user of the mobile terminal 20*aa* may fail to perform the TV conference with such a transmission terminal.

Referring back to FIG. 14, the user of the mobile terminal 20*aa* selects a desired one of the transmission terminals the user wishes to perform the communications with from the destination list of the destination list display screen (step S1814).

Subsequently, the transmitter-receiver 11 of the mobile terminal 20*aa* transmits start request information including the user ID "02AA" of the request source terminal 20*aa* and the user ID "02AB" of the destination terminal 20*ab* to the text chat management system 50₂ (step S1815). When the start request information is transmitted to the text chat management system 50₂, the text chat management system 50, acquires the IP address of the request source terminal.

Accordingly, the text chat management system 50₂ reads the IP address of the mobile terminal 20*ab* serving as the destination terminal by referring to the ID management table, and establishes a session of the text chat between the mobile terminal 20aa and the mobile terminal 20ab (step S1816). Note that the establishment of the session indicates enabling the transmission terminals to perform communications with one another (i.e., implementation of communications connections between the transmission terminals).

In the session established by the TV conference management system $50_1$, the relay apparatus 30 establishes a session when requested by the TV conference management system $50_1$. However, in the text chat service, the text chat management system $50_2$ establishes a session. Note that the relay apparatus 30 may establish a session in the text chat service.

Further, a process in which the mobile terminal 20aa logs into the text chat management system $50_2$ is described in FIG. 14. However, a process in which the TV conference-specific terminal 10 logs in on the TV conference management system $50_1$ is similar to the process described in FIG. 16.

First Embodiment

In a first embodiment, a description is given of a transmission system 1 in which the service management server 60 reads the communications ID in association with the user ID from the user identification information management table and transmit the read communications ID to the TV conference management system $50_1$.

Figure 17:
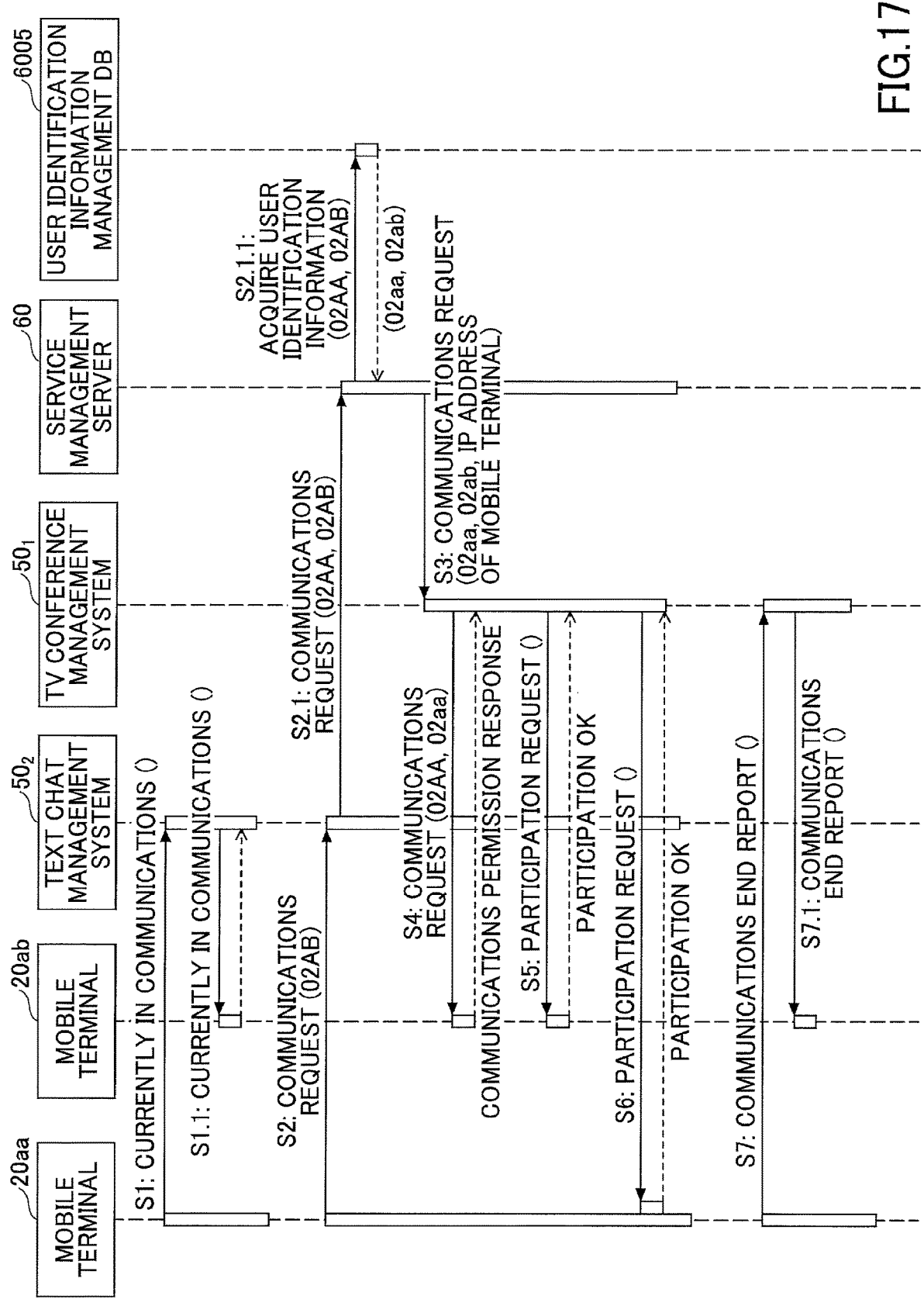
FIG. 17 is a sequence diagram illustrating an example of a process of shifting the access from the text chat service to the access to the TV conference service while the mobile terminal 20aa and mobile terminal 20ab use the text chat service.

FIG. 17 is a sequence diagram illustrating an example of a process of shifting the access from the text chat service to the access to the TV conference service while the mobile terminal 20aa and mobile terminal 20ab use the text chat service.

In step S1, as illustrated in a sequence diagram in FIG. 14, a session is established between the mobile terminal 20aa and the mobile terminal 20ab such that the mobile terminal 20aa and the mobile terminal 20ab are currently in communications with each other via the text chat management system $50_2$. That is, the mobile terminal 20aa transmits a text message input by the user to the text chat management system $50_2$.

In step S1.1, the text chat management system $50_2$ transmits the text message to the mobile terminal 20ab.

Subsequently, when a user of the mobile terminal 20aa considers using the TV conference service while performing the text chat, the user performs operations to start the TV conference service.

Figure 18:
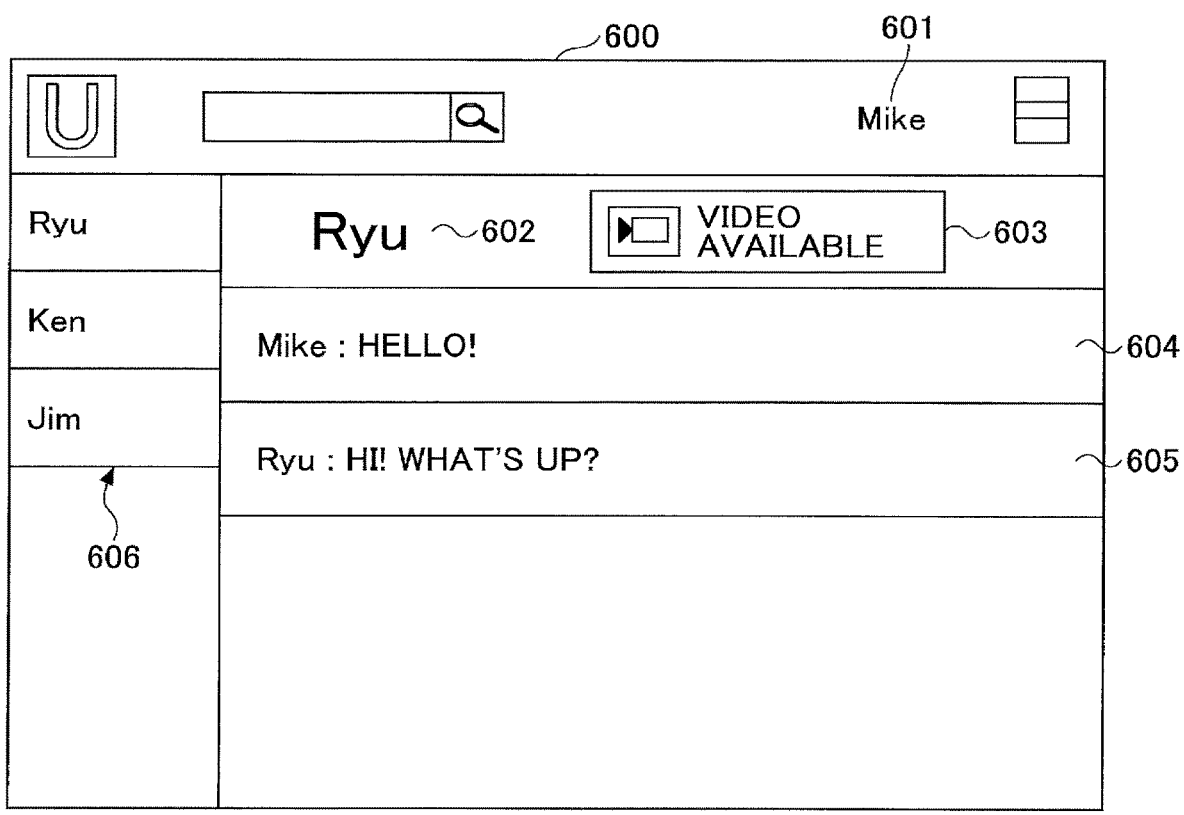
FIG. 18 is a diagram illustrating an example of a text chat screen displayed on a display device of the mobile terminal.

FIG. 18 is a diagram illustrating an example of a text chat screen 600 displayed on a display device 203 of the mobile terminal 20aa. The text chat screen 600 includes a user name display 601 indicating the user name of himself/herself, a partner user name display 602 indicating a partner name of the text chat, a TV conference start button 603, chat display fields 604 and 605, and a text chat available user display field 606.

Initially, the user name display 601 indicates that a user having the user name "Mike" has logged into the text chat management system $50_2$. Further, the partner user name display 602 indicates that a current chat partner is a user having the user name "Ryu". Further, the chat display field 604 displays text input by the user having the user name "Mike", and the chat display field 605 displays text input by the user having the user name "Ryu". In addition, the text chat available user display field 606 displays user names of the users available for the text chat. The users available for the text chat indicate those who own the transmission terminals that are online (communicative), or those who own the transmission terminals having an operating status in the ID management table "online". That is, the users of the mobile terminals 20 that are online among the destination terminal candidates included in the destination list illustrated in FIG. 8.

The "video available" presented on the TV conference start button 603 indicates that the user "Mike" is able (ready) to start a TV conference with the current chat partner "Ryu". In the TV conference, the destination is specified by the communications ID as described above. Hence, in a condition where the user is ready to start the TV conference, at least the user ID and the communications ID of the user "Ryu" need to be associated with each other in the user identification information management DB 6005. Note that when the user ID and the communications ID of the user "Ryu" are not associated with each other, a message "Non available" will be displayed.

The user of the mobile terminal 20aa presses the TV conference start button 603. The following description is given by referring back to FIG. 17. In step S2, the transmitter-receiver 11 of the mobile terminal 20aa transmits the user ID (02AB) of the text chat communications partner together with the communications request to the text chat management system $50_2$.

In step S2.1, when the transmitter-receiver 51 of the text chat management system $50_2$ receives the user ID (02AB) together with the communications request, the transmitter-receiver 51 transmits the user IDs (02AA, 02AB) together with the communications request to the service management server 60. Note that the user ID (02AA) of the mobile terminal 20aa may, for example, be maintained by the session management table.

In step S2.1.1, when the transmitter-receiver 61 of the service management server 60 receives the user IDs (02AA, 02AB) together with the communications request, the account creating request part 63 read the communications IDs in association with the respective user IDs (02AA, 02AB) from the user identification information management DB 6005. In the user identification information management table in FIG. 13, the user ID (02AA) is associated with the communications ID (02aa), and the user ID (02AB) is associated with the communications ID (02ab). Hence, the communications IDs (02aa, 02ab) are returned.

In step S3, the transmitter-receiver 61 of the service management server 60 transmits the communications IDs (02aa, 02ab) read from the user identification information management table together with the communications request to the TV conference management system $50_1$. Further, the transmitter-receiver 61 of the service management server 60 transmits IP addresses in association with the user IDs (02AA, 02AB) registered in the ID management table to the TV conference management system $50_1$.

In step S4, the TV conference management system $50_1$ and the service management server 60 are authenticated in advance, and hence, the TV conference management system $50_1$ determines that an authentication process (step S1803 in FIG. 14) is not necessary for the communications request from the service management server 60. Thus, the TV conference management system $50_1$ acquires the communications request from the service management server 60 as start request information (step S1815 in FIG. 14). As a result, the temporary communications management part 42 of the TV conference management system $50_1$ transmits the user ID (02AA) and the communications ID (02aa) to the mobile terminal 20ab.

Note that as a result of the process in FIG. 15, since the mobile terminal 20ab is assumed to be online, a session is established between the mobile terminal 20ab and the TV conference management system $50_1$. Accordingly, the TV conference management system $50_1$ may be able to transmit the communications request to the mobile terminal 20ab by using the communications ID (02ab) acquired in step S3 (the mobile terminal 20aa invites the mobile terminal 20ab to the TV conference). In this example, the user of the mobile terminal 20ab gives communications permission (receives the invitation).

In step S4, since the TV conference management system $50_1$ reports the user ID (02AA), the user of the mobile terminal 20ab may be able to detect that the communications request is received from the user of the mobile terminal 20aa who currently performs communications with the user of the mobile terminal 20ab. On the other hand, the communications ID (02aa) is used by the mobile terminal 20ab for specifying the mobile terminal 20aa with respect to the TV conference management system $50_1$; however, the communications ID (02aa) is not displayed on the mobile terminal 20ab. Hence, the communications ID (02aa) of the mobile terminal 20aa is concealed from the user of the mobile terminal 20ab, thereby preventing the user of the mobile terminal ab from transmitting the communications request for performing the TV conference to the mobile terminal later.

The temporary communications management part 42 of the TV conference management system $50_1$ registers the session ID, the relay apparatus ID, the request source communications ID, and the destination communications ID in the session management table. Further, the temporary communications management part 42 of the TV conference management system $50_1$ requests the service management server 60 to register the operating status, the received time, and the IP address in association with the communications IDs of the mobile terminals 20aa and 20ab in the ID management table. As a result, the temporary communications management part 42 of the TV conference management system $50_1$ may be able to establish a session between the mobile terminal 20aa and the mobile terminal 20ab.

In step S5, the temporary communications management part 42 of the TV conference management system $50_1$ transmits a participation request to the mobile terminal 20ab. In response to the participation request, the mobile terminal 20ab transmits participation OK to the TV conference management system $50_1$. By participation of the mobile terminal 20ab, the mobile terminal 20ab may be able to transmit or receive image data or sound data with respect to the mobile terminal 20aa.

In step S6, the temporary communications management part 42 of the TV conference management system $50_1$ transmits a participation request to the mobile terminal 20aa. In response to the participation request, the mobile terminal 20aa transmits participation OK to the TV conference management system $50_1$. By participation of the mobile terminal 20aa, the mobile terminal 20aa may be able to transmit or receive image data or sound data with respect to the mobile terminal 20ab.

Note that the user of the mobile terminal 20aa activates a TV conference service application after transmission of the communications request in step S2, or the mobile terminal 20aa automatically activates the TV conference service application in conjunction with the communications request.

In step S7, when the user terminates the TV conference, the transmitter-receiver 11 of the mobile terminal 20aa transmits a communications end report to the TV conference management system $50_1$. Note that to terminate the TV conference indicates that the user presses an end button in the TV conference service application, or that the user terminates the TV conference service application.

In step S7.1, the temporary communications management part 42 of the TV conference management system $50_1$ transmits a communications end report to the mobile terminal 20ab. Note that the text chat management system $50_2$ is requested to update items of the ID management table such as the operating status.

When Mobile Terminal 20ab Rejects Communications

Figure 19:
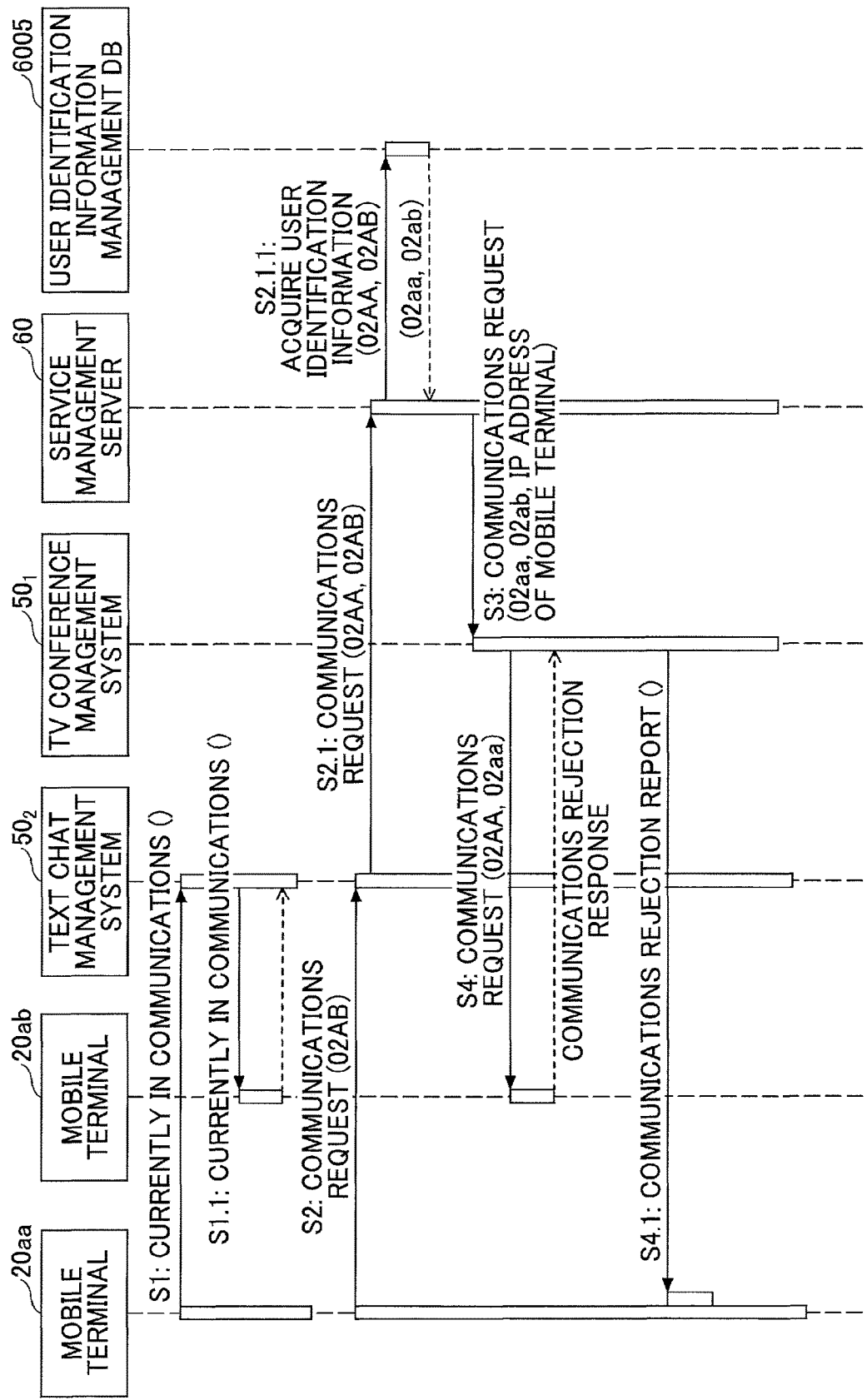
FIG. 19 is a sequence diagram illustrating a process in which the user of the mobile terminal 20aa attempts to start the TV conference but is rejected by the mobile terminal 20ab while the mobile terminal 20aa and mobile terminal 20ab use the text chat service.

FIG. 19 is a sequence diagram illustrating a process in which the user of the mobile terminal 20aa attempts to start the TV conference but is rejected by the mobile terminal 20ab while the mobile terminal 20aa uses the text chat service. Note that in the illustration in FIG. 19, a part differing from the process illustrated in FIG. 17 is mainly described. In step S4, the temporary communications management part 42 of the TV conference management system $50_1$ transmits a communications request to the mobile terminal 20ab. In this step, it is assumed that the user of the mobile terminal has rejected starting the TV conference (rejects an invitation). Since the invitation is rejected, there are no changes in the session management table and the ID management table.

In step S4.1, the transmitter-receiver 51 of the text chat management system $50_2$ receives a communications rejection response, and the temporary communications management part 42 transmits a communications rejection report to the mobile terminal 20aa. As a result, the user of the mobile terminal 20aa may be able to detect the communications by the TV conference service being rejected.

As described above, in the transmission system 1 according to the first embodiment, the communications IDs are maintained in association with the user IDs, the user who uses the service of the text chat system may be able to use the service of the TV conference system by acquiring the communications ID.

Second Embodiment

In the second embodiment, an illustration is given of a process in which the TV conference management system 501 creates the communications IDs to enable the mobile terminal 20aa and the mobile terminal 20ab to conduct the TV conference.

In this specification, components provided with identical reference numbers serve similar functions, and thus, different components may be mainly described and a duplicated illustration may be omitted.

FIG. 20 is a diagram illustrating an example of a user identification information management table in the second embodiment. In the user identification information management table in the second embodiment, the user ID and the communications ID of the mobile terminal 20ab are not registered in association. This is because the user of the mobile terminal 20ab does not have an account (i.e., the communications ID and password) for using the TV conference service. Accordingly, the service management server 60 is unable to read the communications ID in association with the user ID from the user identification information management table. Thus, the service management server 60 creates an account (the communications ID) of the user of the mobile terminal 20ab as follows. Note that the communications ID of the user of the mobile terminal 20ab to be created is "02ab".

Figure 21:
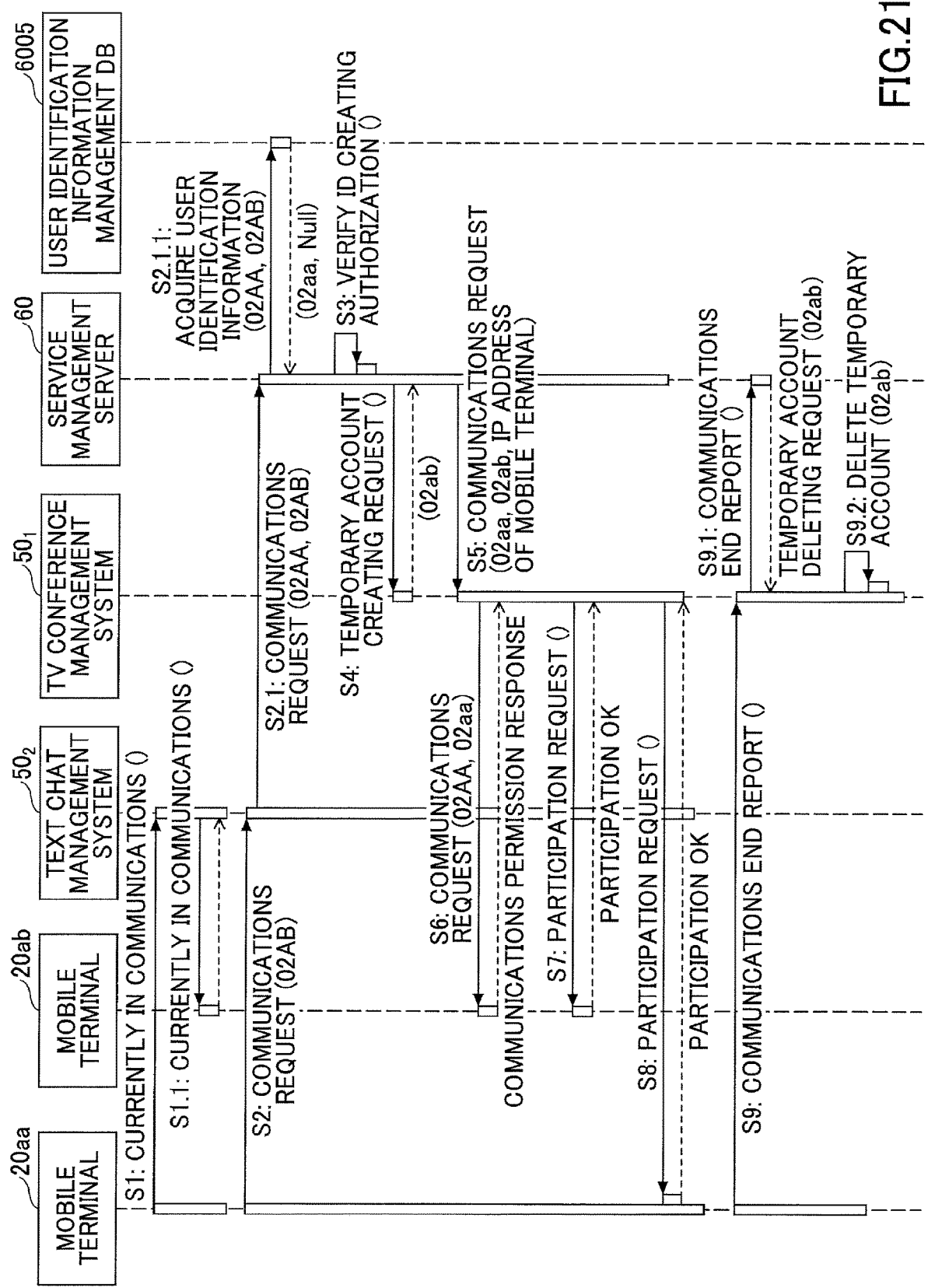
FIG. 21 is a sequence diagram illustrating an example of a process of shifting the access from the text chat service to the access to the TV conference service while the mobile terminal 20aa and mobile terminal 20ab use the text chat service (second embodiment)

FIG. 21 is a sequence diagram illustrating an example of a process of shifting the access from the text chat service to the access to the TV conference service while the mobile terminal 20aa and mobile terminal 20ab use the text chat service.

In step S1, as illustrated in the sequence diagram in FIG. 14, a session is established between the mobile terminal 20aa and the mobile terminal 20ab such that the mobile terminal 20aa and the mobile terminal 20ab are currently in communications with each other via the text chat management system $50_2$. That is, the mobile terminal 20aa transmits a text message input by the user to the text chat management system $50_2$.

In step S1.1, the text chat management system $50_2$ transmits the text message to the mobile terminal 20ab.

Subsequently, when a user of the mobile terminal 20aa considers using the TV conference service while performing the text chat, the user performs operations to start the TV conference service. The text chat screen is as already illustrated in FIG. 18; however, the TV conference start button 603 displays "Non available". The user of the mobile terminal 20aa presses the TV conference start button 603.

In step S2, the transmitter-receiver 11 of the mobile terminal 20aa transmits the user ID (02AB) together with the communications request to the text chat management system $50_2$.

In step S2.1, when the transmitter-receiver 51 of the text chat management system $50_2$ receives the user ID (02AB) together with the communications request, the transmitter-receiver 51 transmits the user IDs (02AA, 02AB) together with the communications request to the service management server 60. Note that the user ID (02AA) of the mobile terminal 20aa may, for example, be maintained by the session management table.

In step S2.1.1, when the transmitter-receiver 61 of the service management server 60 receives the user IDs (02AA, 02AB) together with the communications request, the account creating request part 63 read the communications IDs in association with the respective user IDs (02AA, 02AB) from the user identification information table. In the user identification information management table in FIG. 20, the user ID (02AA) is associated with the communications ID (02aa), but the user ID (02AB) is not associated with the communications ID (02ab). That is, the user ID (02AB) is not registered in the user identification information management table. Hence, null is returned with respect to the user ID (02AB) as the communications ID. Null indicates an invalid (void) value or zero.

In step S3, the account creating request part 63 determines that it is necessary to create a temporary account because null is returned as the communications ID. In order to create the temporary account, the account creating request part 63 determines whether the user of the communications ID (02aa) has authorization to create an ID (ID creating authorization) by referring to the authentication management table. In this example, it is assumed that the user of the communications ID (02aa) has the ID creating authorization.

In step S4, the account creating request part 63 transmits a temporary account creating request to the TV conference management system $50_1$.

When the transmitter-receiver 51 of the TV conference management system $50_1$ receives the temporary account creating request, the temporary account creating part 41 creates a temporary account. This temporary account is a communications ID, and a not duplicated communications ID (02ab) is created. The account creating request part 63 of the service account management server 60 registers the communications ID (02ab) in association with the user ID (02AB) in the user identification information management table. As a result, the user ID and the communications ID are managed in association while using the TV conference service. In step S5, the transmitter-receiver 61 of the service management server 60 transmits the communications ID (02aa) and the temporary created communications ID (02ab) read from the user identification information management table together with the communications request to the TV conference management system $50_1$. Further, the transmitter-receiver 61 of the service management server 60 transmits IP addresses in association with the user IDs (02AA, 02AB) registered in the ID management table to the TV conference management system $50_1$.

In step S6, the TV conference management system $50_1$ and the service management server 60 are authenticated in advance, and hence, the TV conference management system $50_1$ determines that an authentication process (step S1803 in FIG. 14) is not necessary for the communications request from the service management server 60. Thus, the TV conference management system $50_1$ acquires the communications request from the service management server 60 as a start request information (step S1815 in FIG. 14). As a result, the temporary communications management part 42 of the TV conference management system $50_1$ transmits the user ID (02AA) and the communications ID (02aa) together with the communications request to the mobile terminal 20ab. Details of step S6 are similar to those of step S4 illustrated in FIG. 17. In this example, it is assumed that the user of the mobile terminal 20ab has given communications permission.

Note that the temporary communications management part 42 of the TV conference management system $50_1$ registers the session ID, the relay apparatus ID, the request source communications ID, and the destination communications ID in the session management table. Further, the temporary communications management part 42 of the TV conference management system $50_1$ requests the service management server 60 to register the operating status, the received time, and the IP address in association with the communications IDs of the mobile terminals 20aa and 20ab in the ID management table. As a result, the temporary communications management part 42 of the TV conference management system $50_1$ may be able to establish a session between the mobile terminal 20aa and the mobile terminal 20ab.

In step S7, the temporary communications management part 42 of the TV conference management system $50_1$ transmits a participation request to the mobile terminal 20ab. In step S8, the temporary communications management part 42 of the TV conference management system $50_1$ transmits a participation request to the mobile terminal 20aa.

In step S9, when the user terminates the TV conference, the transmitter-receiver 11 of the mobile terminal 20aa transmits a communications end report to the TV conference management system $50_1$.

In step S9.1, the temporary communications management part 42 of the TV conference management system $50_1$ transmits a communications end report to the service management server 60. In response, the account creating request part 63 of the service management server 60 transmits a temporary account deleting request to the TV conference management system $50_1$. Note that the account creating request part 63 of the service account management server 60 deletes the communications ID (02ab) and the user ID (02AB) from the user identification information management table.

In step S9.2, the temporary account creating part 41 of the TV conference management system $50_1$ deletes the temporary account created in step S2.1.2. That is, the temporary account creating part 41 deletes the session ID and the like from the session management table, and requests the text chat management system $50_2$ to update the items of the ID management table such as the operating status. As a result, it may be possible to prevent the temporary account from remaining in the session management table.

When Mobile Terminal 20ab Rejects Communications

Figure 22:
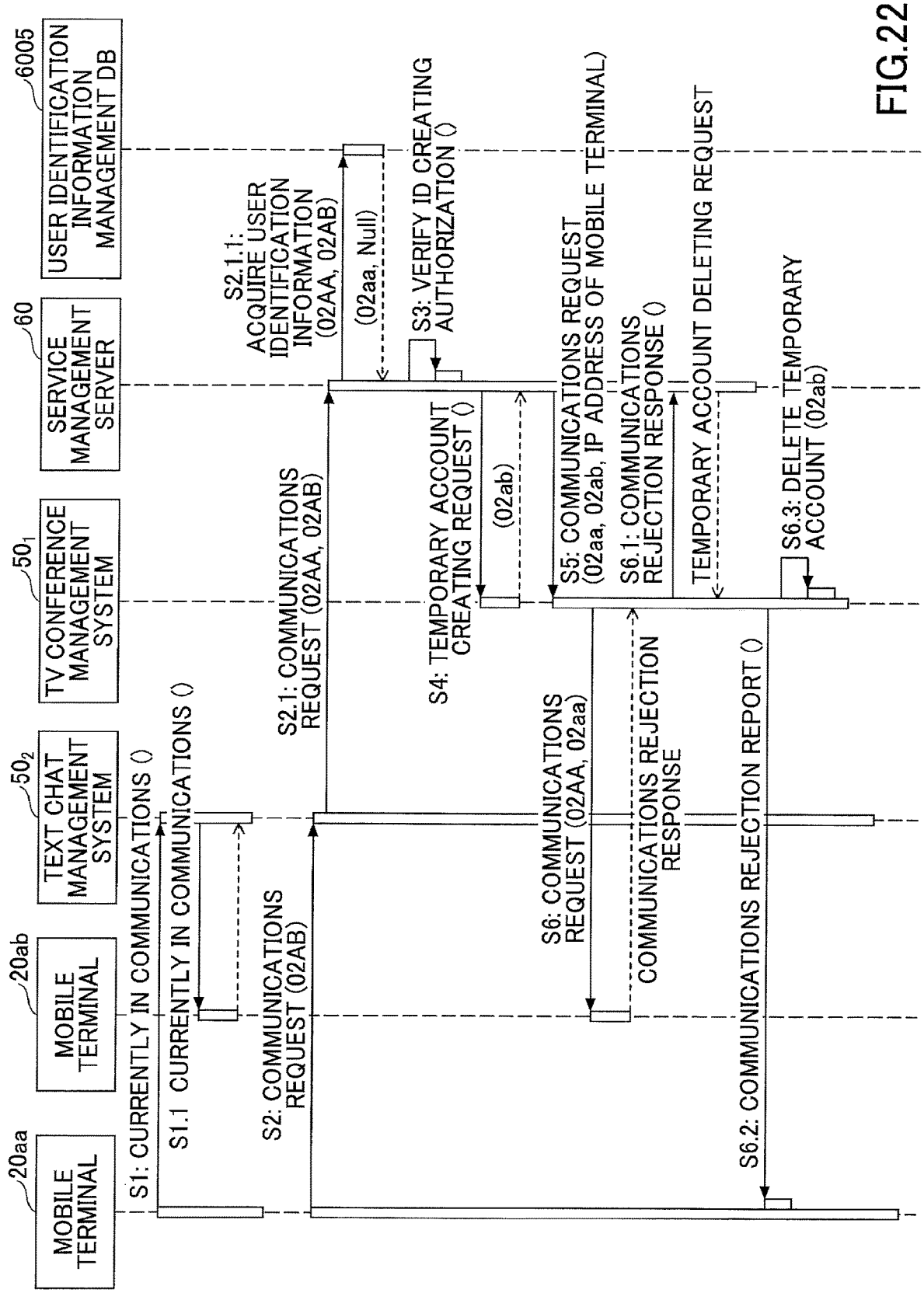
FIG. 22 is a sequence diagram illustrating a process in which the user of the mobile terminal 20aa attempts to start the TV conference but is rejected by the mobile terminal 20ab while the mobile terminal 20aa and mobile terminal 20ab use the text chat service (second embodiment)

FIG. 22 is a sequence diagram illustrating a process in which the user of the mobile terminal 20aa attempts to start the TV conference but is rejected by the mobile terminal 20ab while the mobile terminal 20aa and mobile terminal 20ab use the text chat service. Note that in the illustration in FIG. 22, a part differing from the process illustrated in FIG. 21 is mainly described. In step S6, the temporary communications management part 42 of the TV conference management system $50_1$ transmits a communications request to the mobile terminal 20ab. In this step, it is assumed that the user of the mobile terminal has rejected starting the TV conference (rejects an invitation). Since the invitation is rejected, there are no changes in the session management table and the ID management table. In step S6.1, the transmitter-receiver 51 of the text chat management system $50_2$ receives a communications rejection response, the temporary communications management part 42 transmits the communications rejection response to the service management server 60. In response, the account creating request part 63 of the service management server 60 transmits a temporary account deleting request to the TV conference management system $50_1$. Note that the account creating request part 63 of the service account management server 60 deletes the communications ID (02ab) and the user ID (02AB) from the user identification information management table.

In step S6.2, the temporary communications management part 42 of the TV conference management system $50_1$ transmits a communications rejection report to the mobile terminal 20aa.

In step S6.3, the temporary account creating part 41 of the TV conference management system $50_1$ deletes the temporary account created in step S2.1.2.

FIG. 23 is a flowchart illustrating a process of steps S2.1 to S5 performed by the service management server illustrated in FIGS. 21 and 22.

The account creating request part 63 of the service account management server 60 acquires the communications ID in association with the user ID from the user information management table (step S10).

Subsequently, the account creating request part 63 of the service account management server 60 determines whether the communications ID in association with the user ID is acquired (step S20). That is, the account creating request part 63 determines whether the communications ID includes the above-described Null.

When the determination in step S20 is YES, the account creating request part 63 proceeds with step S50 because it is not necessary to create the communications ID. In this case, the process is similar to that of the first embodiment.

When the determination in step S20 is NO, the account creating request part 63 of the service account management server 60 determines whether the user of the mobile terminal 20aa has authorization to create the communications ID (communications ID creating authorization) (step S30).

When the determination in step S30 is NO, the account creating request part 63 transmits a non-communications permission report to the mobile terminal 20aa via the text chat management system $50_2$ (step S60) because it is not necessary to create the communications ID. That is, since it is not possible to create the communications ID of the user of the mobile terminal 20ab, the account creating request part 63 reports such an indication to the user of the mobile terminal 20aa.

When the determination in step S20 is NO, the account creating request part 63 of the service account management server 60 transmits the communications ID creating request to the TV conference management system $50_1$ (step S40). That is, the account creating request part 63 requests the TV conference management system $50_1$ to create the communications ID only when the communications ID is not registered in the user identification information management table.

The account creating request part 63 of the service account management server 60 transmits the communications ID to the TV conference management system $50_1$ (step S50).

As described above, in the transmission system 1 according to the second embodiment, since the temporarily available communications ID is created with respect to the user who has no communications ID, it may be possible to perform communications using the communications ID while using the text chat service.

Preferred Modification

The preferred embodiments and examples are described above; however, the present invention is not limited to those embodiments and examples. Various alteration and modification may be made within the scope without departing from the gist of the present invention.

For example, various types of databases included in the service management server 60 may be held by the transmission system 50. Alternatively, the transmission management system 50 and the service management server 60 may be provided as one apparatus.

Further, the nonvolatile storages 5000, 1000, and 6000 may be located anywhere insofar as the nonvolatile storages 3000, 1000, and 9000 are accessible by the service management server 60 via the communications network 2.

In the above-described embodiments, a case where the user starts using the TV conference service while using the text chat service is illustrated; however, the user may start using the text chat service while using the TV conference service. In such a case, the service management server 60 creates the user ID when the communications ID and the user ID are not registered in the user identification information management table.

Further, in the above-described embodiments, the service management server 60 requests the TV conference management system $50_1$ to create the communications ID; however, the service management server 60 may create the communications ID. Moreover, the TV conference management system $50_1$ may create the communications ID without being intervened by the service management server 60.

In addition, there may be multiple TV conference management systems $50_1$ and multiple text chat management systems $50_2$ in the transmission system 1. Moreover, some functional components of the multiple TV conference management systems $50_1$ and functional components of the multiple text chat management systems $50_2$ may be held by different apparatuses.

Further, the transmission system 1 according to the above described embodiments and modification is illustrated by giving the examples of the TV conference system and the text chat system; however, a combination of any of a telephony system, an SNS (social network service), and an electronic mail system may be applied to the transmission system 1.

According to the embodiments and modification, there is provided a transmission technology capable of allowing a user to use a service to communicate with a communication partner having no account of the service while communicating with the communication partner in a difference service.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

The present application is based on and claims the benefit of priority of Japanese Priority Application No. 2014-211516 filed on Oct. 16, 2014, the entire contents of which are hereby incorporated herein by reference.

What is claimed is:

1. A transmission system including a first transmission terminal and a second transmission terminal, the first transmission terminal transmitting data to the second transmission terminal, the transmission system comprising:
a first communications connector configured to connect first bidirectional data communications between the first transmission terminal specified by first identification information and the second transmission terminal specified by second identification information;
an identification information creating part configured to create fourth identification information of the second transmission terminal in response to receiving a request for connecting second bidirectional data communications between the first transmission terminal and the second transmission terminal during the first bidirectional data communications between the first transmission terminal and the second transmission terminal; and
a second communications connector configured to acquire third identification information in association with the first identification information by referring to registration information registering the third identification information in association with the first identification information of the first transmission terminal, and connect the second bidirectional data communications between the first transmission terminal specified by the third identification information and the second transmission terminal specified by the fourth identification information.

2. The transmission system as claimed in claim 1, wherein the identification information creating part creates the fourth identification information when the registration information does not have identification information in association with the second identification information for connecting the second bidirectional data communications, and acquires the identification information in association with the second identification information as the fourth identification information when the registration information has the identification information in association with the second identification information for connecting the second bidirectional data communications, and
the second communications connector connects the second bidirectional data communications between the first transmission terminal specified by the third identification information and the second transmission terminal specified by the fourth identification information.

3. The transmission system as claimed in claim 1, wherein the identification information creating part refers to permission information registering whether creating the identification information in association with the third identification information for connecting the second bidirectional data communications is permitted, and creates the fourth identification information only when the permission information has registered that the creating the identification information in association with the third identification information for connecting the second bidirectional data communications is permitted.

4. The transmission system as claimed in claim 1, wherein, of the first identification information and the third identification information reported from the second communications connector to the second transmission terminal, the third identification information is concealed from a user of the second transmission terminal.

5. The transmission system as claimed in claim 1, wherein the identification information creating part deletes the fourth identification information when communications implemented by the connecting the second bidirectional data communications between the first transmission terminal and the second communications terminal are terminated.

6. The transmission system as claimed in claim 1, wherein the second transmission terminal uses the fourth identification information in the second bidirectional data communications.

7. The transmission system as claimed in claim 1, wherein the first bidirectional data communications include text message communications, and
the second bidirectional data communications include image data communications and voice data communications.

8. The transmission system as claimed in claim 1, wherein
the first communications connector includes a text chat management system, and
the first identification information and the second identification information serve as authentication information when a user logs into the text chat management system.

9. The transmission system as claimed in claim 8, wherein
the second communications connector includes a video conference management system, and
the third identification information and the fourth identification information serve as authentication information when the user logs into the video conference management system.

10. The transmission system as claimed in claim 1, wherein the first transmission terminal uses the first identification information in the first bidirectional data communications.

11. A communications control method executed by a communications control apparatus, the communications control apparatus implementing communications connection between a first transmission terminal and a second transmission terminal, the communications control method comprising:
connecting first bidirectional data communications between the first transmission terminal specified by first identification information and the second transmission terminal specified by second identification information;
creating fourth identification information of the second transmission terminal in response to receiving a request for connecting second bidirectional data communications between the first transmission terminal and the second transmission terminal during the first bidirectional data communications between the first transmission terminal and the second transmission terminal; and
acquiring third identification information in association with the first identification information by referring to registration information registering the third identification information in association with the first identification information of the first transmission terminal, and connecting the second bidirectional data communications between the first transmission terminal specified by the third identification information and the second transmission terminal specified by the fourth identification information.

12. The communications control method as claimed in claim 11, wherein
the fourth identification information is created when the registration information does not have identification information in association with the second identification information for connecting the bidirectional second data communications, and the identification information in association with the second identification information is acquired as the fourth identification information when the registration information has the identification information in association with the second identification information for connecting the second bidirectional data communications, and
the second bidirectional data communications are connected between the first transmission terminal specified by the third identification information and the second transmission terminal specified by the fourth identification information.

13. The communications control method as claimed in claim 11, wherein
permission information registering whether creating the identification information in association with the third identification information for connecting the second bidirectional data communications is permitted is referred to, and
the fourth identification information is created only when the permission information has registered that the creating the identification information in association with the third identification information for connecting the second bidirectional data communications is permitted.

14. The communications control method as claimed in claim 11, wherein, of the first identification information and the third identification information reported from the second communications connector to the second transmission terminal, the third identification information is concealed from a user of the second transmission terminal.

15. The communications control method as claimed in claim 11, wherein the fourth identification information is deleted when communications implemented by the connecting the second bidirectional data communications between the first transmission terminal and the second communications terminal are terminated.

16. The communications control method as claimed in claim 11, wherein the second transmission terminal uses the fourth identification information in the second bidirectional data communications.

17. The communications control method as claimed in claim 11, wherein
the first bidirectional data communications include text message communications, and
the second bidirectional data communications include image data communications and voice data communications.

18. The communications control method as claimed in claim 11, wherein
the first bidirectional data communications are implemented by a text chat management system, and
the first identification information and the second identification information serve as authentication information when a user logs into the text chat management system.

19. The communications control method as claimed in claim 18, wherein
the second bidirectional data communications are implemented by a video conference management system, and
the third identification information and the fourth identification information serve as authentication information when the user logs into the video conference management system.

20. The communications control method as claimed in claim 11, wherein the first transmission terminal uses the first identification information in the first bidirectional data communications.

21. A communications control method performed by a system, the system including a first transmission system transmitting and receiving first data between a first transmission terminal and a second transmission terminal, and a second transmission system transmitting and receiving second data between the first transmission terminal and the second transmission terminal, the communications method comprising:
causing the first transmission system to connect first bidirectional data communications between the first transmission terminal specified by first identification information and the second transmission terminal specified by second identification information;
causing the first transmission system to create fourth identification information of the second transmission terminal in response to receiving a request for connecting second bidirectional data communications between the first transmission terminal and the second transmission terminal during the first bidirectional data communications between the first transmission terminal and the second transmission terminal;

causing the first transmission system to acquire the third identification information in association with the first identification information by referring to registration information registering the third identification information in association with the first identification information of the first transmission terminal;

causing the first transmission system to transmit the third identification information and the fourth identification information to the second transmission system;

causing the second transmission system to receive the third identification information and the fourth identification information; and causing the second transmission system to connect the second bidirectional data communications between the first transmission terminal specified by the third identification information and the second transmission terminal specified by the fourth identification information.

22. The communications control method as claimed in claim 21, wherein the second transmission terminal uses the fourth identification information in the second bidirectional data communications.

23. The communications control method as claimed in claim 21, wherein the first transmission terminal uses the first identification information in the first bidirectional data communications.

* * * * *